US012652387B2

(12) United States Patent
    Egilmez et al.

(10) Patent No.: US 12,652,387 B2
(45) Date of Patent: Jun. 9, 2026

(54) PROBABILITY ADAPTATION RATE ADJUSTMENT AND WINDOWED PROBABILITY UPDATE FOR ENTROPY CODING

(71) Applicant: Apple Inc., Cupertino, CA (US)

(72) Inventors: Hilmi Enes Egilmez, Santa Clara, CA (US); Alexandros Tourapis, Los Gatos, CA (US); Alican Nalci, La Jolla, CA (US); Guoxin Jin, San Diego, CA (US); Hsi-Jung Wu, San Jose, CA (US); Jun Xin, San Jose, CA (US); Yeqing Wu, Cupertino, CA (US); Yixin Du, Milpitas, CA (US); Yunfei Zheng, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/819,841

(22) Filed: Aug. 29, 2024

(65) Prior Publication Data

US 2025/0080726 A1    Mar. 6, 2025

Related U.S. Application Data

(60) Provisional application No. 63/535,269, filed on Aug. 29, 2023.

(51) Int. Cl.
    *H04N 19/107*        (2014.01)
    *H04N 19/124*        (2014.01)
                (Continued)

(52) U.S. Cl.
    CPC ......... *H04N 19/107* (2014.11); *H04N 19/124* (2014.11); *H04N 19/13* (2014.11); *H04N 19/17* (2014.11); *H04N 19/70* (2014.11)

(58) Field of Classification Search
    None
    See application file for complete search history.

(56) References Cited

U.S. PATENT DOCUMENTS

2023/0247206 A1*  8/2023  Peringassery Krishnan ...............
                                        H04N 19/149
                                        375/240.02

OTHER PUBLICATIONS

Krishnan MP, Zhao X, Liu S. Adaptive probability estimation techniques for context adaptive arithmetic coding. In2023 IEEE International Symposium on Circuits and Systems (ISCAS) May 21, 2023 (pp. 1-5). IEEE. (Year: 2023).*

(Continued)

*Primary Examiner* — Clifford Hilaire
(74) *Attorney, Agent, or Firm* — Fish & Richardson P.C.

(57)            ABSTRACT

Systems and methods are configured for accessing data representing video content, the data comprising a set of one or more symbols each associated with a syntax element; performing a probability estimation, for encoding the data, comprising: for each symbol, obtaining, based on the syntax element for that symbol, an adaptivity rate parameter value, the adaptivity rate parameter value being a function of a number of symbols in the set of one or more symbols; updating the adaptivity rate parameter value as a function of an adjustment parameter value; and generating, based on the updated adaptivity rate parameter value, a probability value; generating a probability estimation; and encoding, based on the CDF of the probability estimation, the data comprising the set of one or more symbols for transmission.

18 Claims, 8 Drawing Sheets

(51) Int. Cl.
　　 *H04N 19/13* 　　　 (2014.01)
　　 *H04N 19/17* 　　　 (2014.01)
　　 *H04N 19/70* 　　　 (2014.01)

(56) References Cited

OTHER PUBLICATIONS

Chan KH, Im SK. Optimization and implementation of adaptation rate in vvc. In2021 4th International Conference on Information and Communications Technology (ICOIACT) Aug. 30, 2021 (pp. 299-303). IEEE. (Year: 2021).*

Bross, "Overview of the Versatile Video Coding (VVC) Standard and its Applications," IEEE Transactions on Circuits and Systems for Video Technology, Aug. 2, 2021, 31(10):3736-3764.

Chen et al., "An Overview of Core Coding Tools in the AV1 Video Codec," 2018 Picture Coding Symposium (PCS), Jun. 24-27, 2018, San Francisco, CA, USA, pp. 41-45.

Han et al., "Probability Model Estimation for M-Ary Random Variables," 2022 IEEE International Conference on Image Processing (ICIP), Oct. 16-19, 2022, Bordeaux, France, pp. 3021-3025.

Marpe et al., "Context-Based Adaptive Binary Arithmetic Coding in the H.264/AVC Video Compression Standard," IEEE Transactions on Circuits and Systems for Video Technology, Aug. 4, 2003, 13(7):620-636.

Said, "Introduction to Arithmetic Coding—Theory and Practice," CoRR, Submitted on Feb. 2, 2023, arXiv:2302.00819v1, 67 pages.

Sullivan et al., "Overview of the High Efficiency Video Coding (HEVC) Standard," IEEE Transactions on Circuits and Systems for Video Technology, Sep. 28, 2012, 22(12):1649-1668.

Wiegand et al., "Overview of the H.264/AVC Video Coding Standard," IEEE Transactions on Circuits and Systems for Video Technology, Aug. 4, 2003, 13(7):560-576.

* cited by examiner

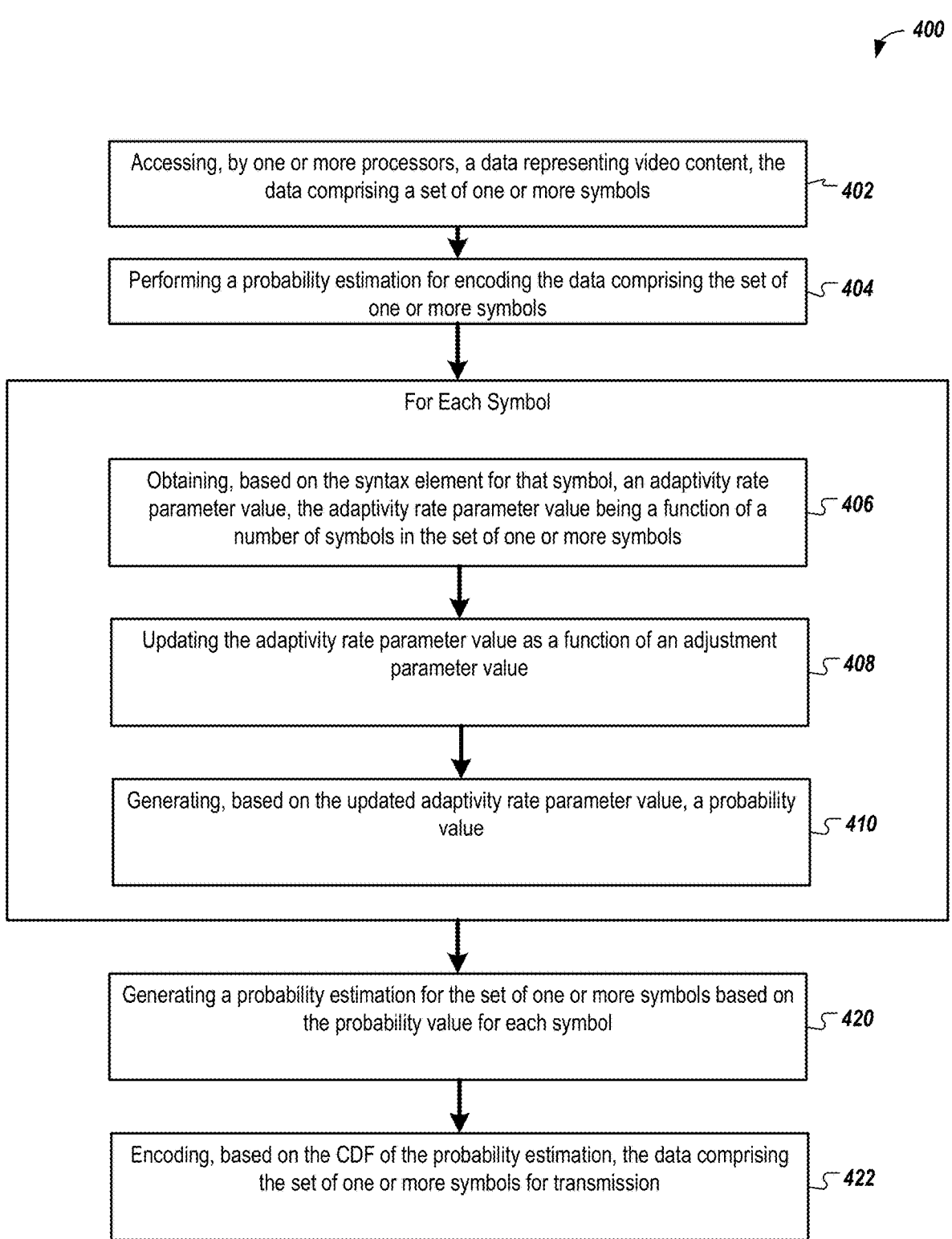

*400*

Accessing, by one or more processors, a data representing video content, the data comprising a set of one or more symbols — *402*

Performing a probability estimation for encoding the data comprising the set of one or more symbols — *404*

For Each Symbol

Obtaining, based on the syntax element for that symbol, an adaptivity rate parameter value, the adaptivity rate parameter value being a function of a number of symbols in the set of one or more symbols — *406*

Updating the adaptivity rate parameter value as a function of an adjustment parameter value — *408*

Generating, based on the updated adaptivity rate parameter value, a probability value — *410*

Generating a probability estimation for the set of one or more symbols based on the probability value for each symbol — *420*

Encoding, based on the CDF of the probability estimation, the data comprising the set of one or more symbols for transmission — *422*

*FIG. 4A*

PROBABILITY ADAPTATION RATE ADJUSTMENT AND WINDOWED PROBABILITY UPDATE FOR ENTROPY CODING

CLAIM OF PRIORITY

This application claims priority under 35 U.S.C. § 119 (e) to U.S. Patent Application Ser. No. 63/535,269, filed on Aug. 29, 2023, the entire contents of which are hereby incorporated by reference.

TECHNICAL FIELD

This disclosure relates generally to encoding and decoding video content.

BACKGROUND

Computer systems may be used to encode and decode video content. As an example, a first computer system can obtain video content, encode the video content in a compressed data format, and provide the encoded data to a second computer system. The second computer system can decode the encoded data and generate a visual representation of the video content based on the decoded data.

SUMMARY

This disclosure is related to probability estimation in entropy coding and methods to improve the compression efficiency for image or video data. The methods and systems presented herein may be applied to next generation image or video coding standards and systems as well as any digital data compression system that employs probability estimators when compressing data.

The systems and techniques described herein can provide various technical benefits. The probability adaptation rate adjustment (PARA) process enables the encoder to adapt/modify the adaptation rate. The PARA process can use fixed (e.g., dependent) modeling on a per-symbol basis, a per-symbol group bases, a per-time interval (e.g., a symbol counter) basis, or based on predefined mapping rules. The PARA process can use signaled variants top enable additional control and/or multi-pass encoders.

The systems and processes enable a coding efficiency improvement. An example overall coding efficiency gain may be about 0.5% on average and up to 2% depending on the implementation. The systems and processes may be implemented in many different video standards/technologies that include multi-symbol arithmetic. For example, the systems and processes may be included in MPEG codecs including HEVC and VVC. The processes may be used in neural network based codecs or other artificial intelligence (AI) based codecs. The methods and processes can reduce bitrates for video based applications.

Implementations of this aspect can include one or more of the following features.

In an aspect, a process includes accessing, by one or more processors, data representing video content, the data comprising a set of one or more symbols each associated with a syntax element. The process includes performing a probability estimation for encoding the data comprising the set of one or more symbols. The probability estimation includes, for each symbol, obtaining, based on the syntax element for that symbol, an adaptivity rate parameter value, the adaptivity rate parameter value being a function of a number of symbols in the set of one or more symbols. The probability estimation includes, for each symbol, updating the adaptivity rate parameter value as a function of an adjustment parameter value. The probability estimation includes, for each symbol, generating, based on the updated adaptivity rate parameter value, a probability value. The probability estimation includes generating a probability estimation for the set of one or more symbols based on the probability value for each symbol. The probability estimation includes a cumulative distribution function (CDF) representing a probability value for the set of one or more symbols. The process includes encoding, based on the CDF of the probability estimation, the data comprising the set of one or more symbols for transmission.

In some implementations, the process includes adjusting the adaptivity rate parameter value based on a scaling function that multiples the adaptivity rate parameter value with the adjustment parameter value. In some implementations, the process includes adjusting the adaptivity rate parameter value based on an offset function that adds the adaptivity rate parameter value to the adjustment parameter value. In some implementations, the process includes adjusting the adaptivity rate parameter value based on an affine function that combines an offset function and a scaling function.

In some implementations, the process includes selecting the adjustment parameter value for adjusting the adaptivity rate parameter value based on a predefined mapping table. In some implementations, the adjustment parameter value is set to a value of 0, −1, −2, 1, or 2, wherein the adjustment parameter value is part of a multiplier of the adaptivity rate parameter value.

In some implementations, the adjustment parameter value is based on a fixed model predefined for an encoder and a decoder configured to receive the encoded data comprising the set of one or more symbols. In some implementations, the fixed model specifies a single adjustment parameter value for all symbols including the set of one or more symbols. In some implementations, the set of one or more symbols comprises a plurality of symbols. The fixed model specifies a first adjustment parameter value for a first subset of the plurality of symbols associated with a first syntax element. The fixed model specifies a second adjustment parameter value for a second subset of the plurality of symbols associated with a second syntax element. The first adjustment parameter value can be different from the second adjustment parameter value. In some implementations, the fixed model specifies that an adjustment parameter value for a group of symbols including the set of one or more symbols. In some implementations, the fixed model specifies a different adjustment parameter value for each symbol in the set of one or more symbols that are associated with a respective different syntax element.

In some implementations, the adjustment parameter value is appended to a CDF initialization table associated with the set of one or more symbols.

In some implementations, the set of one or more symbols comprises a plurality of symbols, and wherein a set of adjustment parameter values associated with the plurality of symbols comprises at least two adjustment parameter values that have a same value.

In some implementations, at least one adjustment parameter value associated with the plurality of symbols is based on a number of coded symbols in the set of one or more symbols.

In some implementations, the process includes receiving a time interval value associated with the set of one or more symbols. In some implementations, the process includes setting the adaptivity rate parameter value based on the time interval value. In some implementations, the adaptivity rate parameter value for a time interval value is unique to that time interval. In some implementations, the adaptivity rate parameter value for the time interval value is further adjusted using a different adjustment parameter value for each symbol associated with the time interval value. In some implementations, the adaptivity rate parameter value for the time interval value is further adjusted using a same adjustment parameter value for all symbols in the set of one or more symbols associated with the time interval value.

In some implementations, the process includes accessing, from a look-up table, a set of possible configurations for the adjustment parameter value, wherein the accessing is based on an index value for the look-up table, the index value being appended to a CDF initialization table.

In some implementations, the adjustment parameter value is specified for a video frame, a sub-picture, a slice, or a sequence associated with the set of one or more symbols.

In some implementations, the adjustment parameter value is specified for a particular block including an intra-coded block, an inter-coded block, a palette coded block, or an intra-block-copy (IBC) coded block associated with the set of one or more symbols.

In some implementations, the adjustment parameter value is based on a quantization parameter value associated with the set of one or more symbols.

In some implementations, the adjustment parameter value is updated for each intra-coded frame, each B-slice, each P-slice, each key frame, each compound coded frame, or each instantaneous decoder refresh.

In some implementations, the adjustment parameter value is updated based on a residual coding scheme of the data comprising the set of one or more symbols.

In some implementations, the process includes transmitting the encoded data in a real-time communication or live streaming application, wherein the real-time communication or live streaming application is configured to update the adjustment parameter value.

In some implementations, the process includes selecting the adjustment parameter value for a lossless or near-lossless coding scenario.

In some implementations, the process includes selecting the adjustment parameter value based on another adjustment parameter value for another symbol that is not in the set of one or more symbols.

In an aspect, a process includes accessing, by one or more processors, data representing video content, the data comprising a set of symbols each associated with an index value. The process includes performing a probability estimation for encoding the data comprising the set of one or more symbols. The probability estimation includes, for each symbol, accessing a window function that maps at least one adaptivity rate parameter value to one or more index values associated with the set of symbols. The probability estimation includes, for each symbol, updating, based on the at least one adaptivity rate parameter value of the window function, the probability values associated with the set of symbols. The process includes generating a probability estimation for the set of symbols based on the updated probability values, the probability estimation comprising a cumulative distribution function (CDF). The process includes encoding, based on the CDF, the data comprising the set of symbols for transmission.

In some implementations, the at least one adaptivity rate parameter value is applied only to the set of symbols associated with the window function. In some implementations, the window function defines a normalization parameter for normalizing symbols that are not associated with the window function.

In an aspect, a system includes one or more processors and one or more non-transitory computer readable media storing instructions that, when executed by the one or more processors, cause the one or more processors to perform one or more of the foregoing processes.

In an aspect, one or more non-transitory computer readable media store instructions that, when executed by one or more processors, cause the one or more processors to perform one or more of the foregoing processes.

Other implementations are directed to systems, devices, and non-transitory, computer-readable media having instructions stored thereon, that when executed by one or more processors, causes the one or more processors to perform operations described herein.

The details of one or more embodiments are set forth in the accompanying drawings and the description below. Other features and advantages will be apparent from the description and drawings, and from the claims.

BRIEF DESCRIPTION OF DRAWINGS

FIG. 4A-4B each illustrate an example process for encoding operations in accordance with the features described in relation to FIGS. 1-3C.

DETAILED DESCRIPTION

In general, computer systems can encode and decode video content. As an example, a first computer system can obtain video content (e.g., digital video including several frames or video pictures), encode the video content in a compressed data format (sometimes referred to as a video compression format), and provide the encoded data to a second computer system. The second computer system can decode the encoded data (e.g., by decompressing the compressed data format to obtain a representation of the video content). Further, the second computer system can generate a visual representation of the video content based on the decoded data (e.g., by presenting the video content on a display device).

Entropy coding is a part of many image/video compression systems and standards (e.g., H.264/AVC, H.265/HEVC, H.266/VVC and AV1), where coding information (syntax data) is mapped to a stream of bits. In order to achieve efficient data compression, an entropy coding system can use probability estimators to assign probability values for a collection of syntax elements. The probability values can define the mapping between syntax elements and binary codes. An example encoder-decoder architecture includes prediction, transformation, quantization, and entropy coding modules, which may be a part of compression standards and technologies such as H.264/AVC, H.265/HEVC, AV1, and H.266/VVC.

As subsequently described in detail, at an encoder, an input video/image x is predicted using a predictor p to calculate a residual r, where the predictor p is derived from available (decoded) reference pixels in y based on a recon-structed video/image x̂ with delay corresponding to previ-ously coded frames or neighboring blocks. The residual r is then transformed and quantized to generate quantized trans-form coefficients (c), which are input to the entropy encoder with other syntax elements(s).

Figure 2:
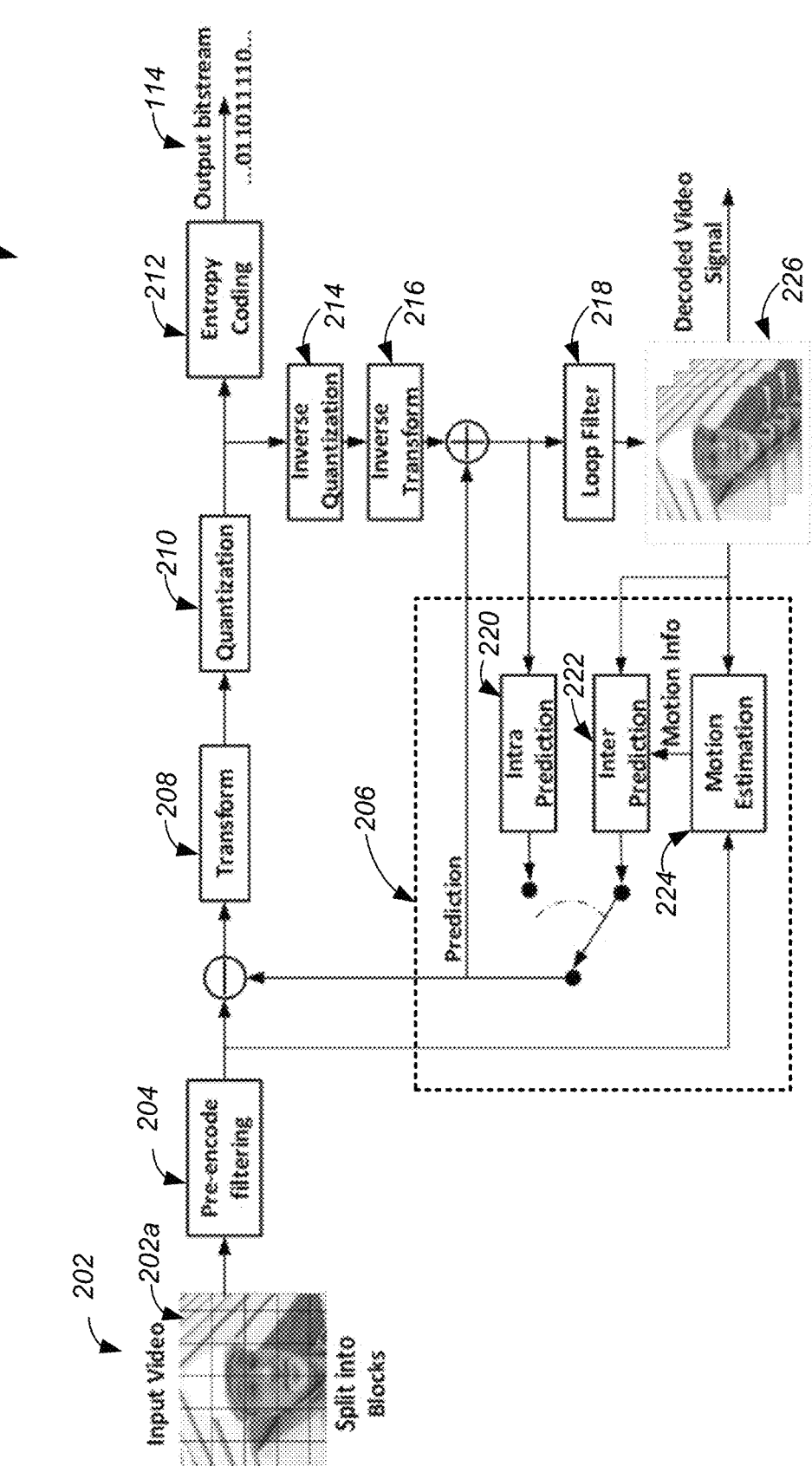
FIG. 2 is a diagram of example encoding and decoding operations.

At the decoder, the processing logic at the encoder may be reversed. For example, as a first step, an entropy decoding process decodes the bitstream to generate c and s identically. The generated c is inverse quantized (e.g., dequantized), and decoded residuals (in r̂) are obtained after inverse transfor-mation. Then, the reconstructed video/image signal (x) is generated after prediction with p (obtained from decoded pixels) and addition of p with the decoded residuals. There may be instances where there are no residual coefficients for a coding unit, in which case the reconstructed signal is directly generated from only the prediction. In some imple-mentations, entropy coding is the last stage at the encoder side, as depicted in FIG. 2 as the entropy encoding building block 212. At the decoder, the entropy decoding may be the first stage of the decoding process.

The systems and methods described herein include are configured for improving a coding efficiency of entropy coding by providing flexible adaptation methods in prob-ability estimation. While some examples and embodiments described herein are built upon AV1/AVM specifications, the examples of the systems and methods described herein may be applied to any image or video coding standard or system that supports a multi-symbol (M-ary) or binary entropy coding.

The systems and methods described herein include the following. An entropy coding engine may be configured for one or more processes for a probability estimation stage. In a first example, a probability adaptation rate adjustment (PARA) process introduces a rate adjustment step modifying the rate adaptation in the probability estimation, as illus-trated in FIG. 3B. In another example, a windowed prob-ability update (WPU) is related to the update step of the probability estimation, as shown in FIG. 3C.

Implementations of the techniques described herein may be used along with various video coding specifications, such as H.264 (AVC), H.265 (HEVC), H.266 (VVC), AV1, and AVM, among others.

The systems and techniques described herein can provide various technical benefits. The PARA process enables the encoder to adapt/modify the adaptation rate. The PARA process can use fixed (e.g., dependent) modeling on a per-symbol basis, a per-symbol group bases, a per-time interval (e.g., a symbol counter) basis, or based on pre-defined mapping rules. The PARA process can use signaled variants top enable additional control and/or multi-pass encoders.

The systems and processes enable a coding efficiency improvement. An example overall coding efficiency gain may be about 0.5% on average and up to 2% depending on the implementation. The systems and processes may be implemented in many different video standards/technologies that include multi-symbol arithmetic. For example, the sys-tems and processes may be included in MPEG codecs including HEVC and VVC. The processes may be used in neural network based codecs or other artificial intelligence (AI) based codecs. The methods and processes can reduce bitrates for video based applications.

Figure 1:
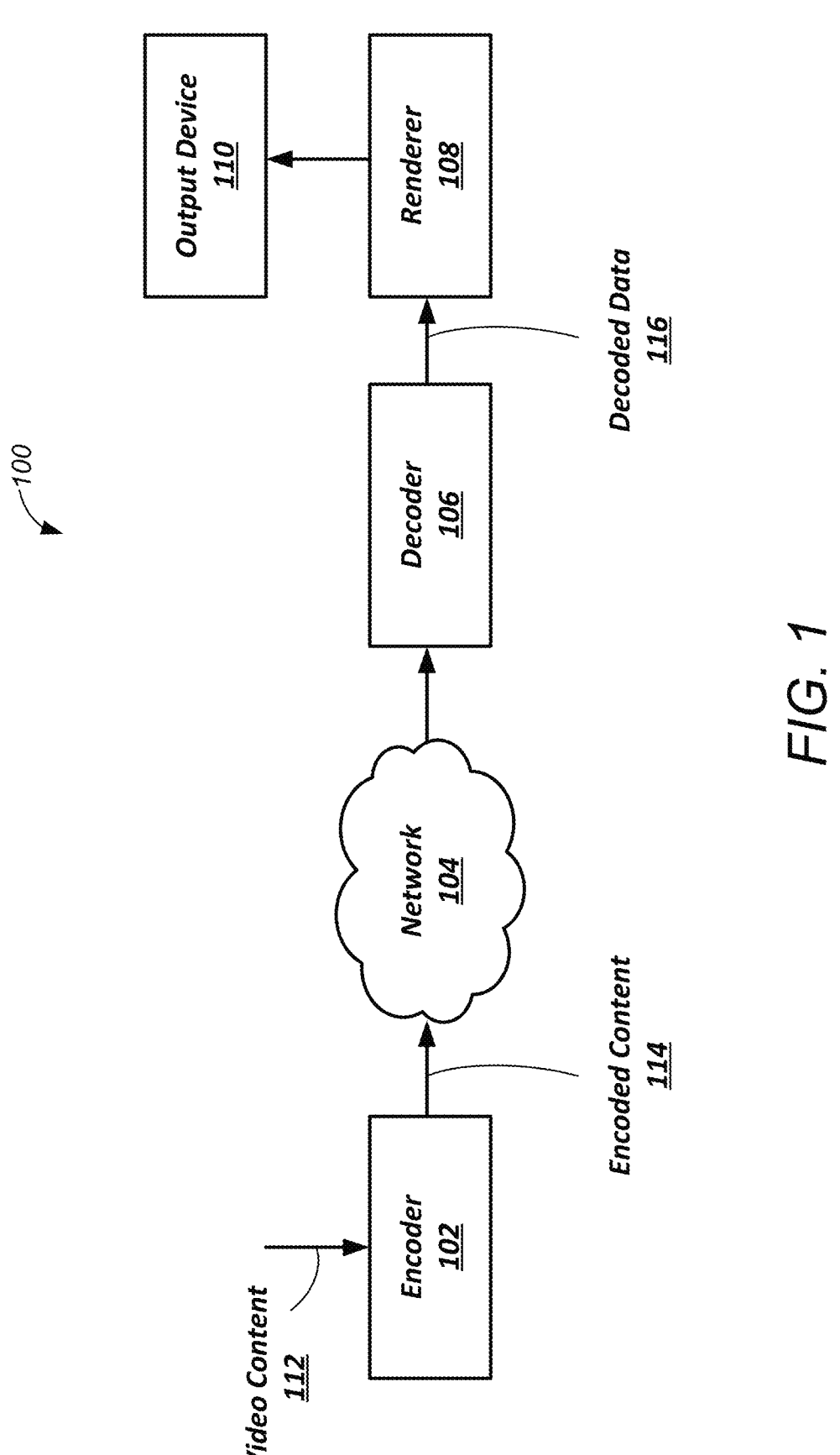
FIG. 1 is a diagram of an example system for encoding and decoding video content.

FIG. 1 is a diagram of an example system 100 for processing and displaying video content. The system 100 includes an encoder 102, a network 104, a decoder 106, a renderer 108, and an output device 110.

During an example operation of the system 100, the encoder 102 receives information regarding video content 112. As an example, the video content 112 can include an electronic representation of moving visual images, such as a series of digital images that are displayed in succession. In some implementations, each of the images may be referred to as frames or video pictures.

The encoder 102 generates encoded content 114 based on the video content 112. The encoded content 114 includes information representing the characteristics of the video content 112, and enables computer systems (e.g., the system 100 or another system) to recreate the video content 112 or approximation thereof. As an example, the encoded content 114 can include one or more data streams (e.g., bit streams) that indicate the contents of each of the frames of the video content 112 and the relationship between the frames and/or portions thereof.

The encoded content 114 is provided to a decoder 106 for processing. In some implementations, the encoded content 114 may be transmitted to the decoder 106 via a network 104. The network 104 may be any communications net-works through which data may be transferred and shared. For example, the network 104 may be a local area network (LAN) or a wide-area network (WAN), such as the Internet. The network 104 may be implemented using various net-working interfaces, for instance wireless networking inter-faces (e.g., Wi-Fi, Bluetooth, or infrared) or wired network-ing interfaces (e.g., Ethernet or serial connection). The network 104 also can include combinations of more than one network and may be implemented using one or more net-working interfaces.

The decoder 106 receives the encoded content 114, and extracts information regarding the video content 112 included in the encoded content 114 (e.g., in the form of decoded data 116). For example, the decoder 106 can extract information regarding the content of each of the frames of the video content 112 and the relationship between the frames and/or portions thereof.

The decoder 106 provides the decoded data 116 to the renderer 108. The renderer 108 renders content based on the decoded data 116 and presents the rendered content to a user using the output device 110. As an example, if the output device 110 is configured to present content according to two dimensions (e.g., using a flat panel display, such as a liquid crystal display or a light emitting diode display), the ren-derer 108 can render the content according to two dimen-sions and according to a particular perspective, and instruct the output device 110 to display the content accordingly. As another example, if the output device 110 is configured to present content according to three dimensions (e.g., using a holographic display or a headset), the renderer 108 can render the content according to three dimensions and according to a particular perspective, and instruct the output device 110 to display the content accordingly.

FIG. 2 shows an example process 200 for encoding and decoding operations in greater detail. An encoder (such as encoder 102 of FIG. 1) receives input video 202 (e.g., the video content 112), the splits or partitions the input video into several units or blocks. As an example, each frame of the video content may be partitioned into a number of smaller regions such as region 202a (e.g., rectangular, or square regions). In some implementations, each region may be further partitioned into a number of smaller sub-regions (e.g., rectangular, or square sub-regions). In some implementations, a frame may be split into smaller coding-tree units (CTUs) or super-blocks (SBs). Further, a CTU or SB can further be divided into smaller coding blocks (CBs).

The encoder 102 can filter the video content according to a pre-encoding filtering stage (block 204). As examples, the pre-encoding filtering stage 204 may be used to remove spurious information from the video content and/or remove certain spectral components of the video content (e.g., to facilitate encoding of the video content). As further examples, the pre-encoding filtering stage may be used to remove interlacing form the video content, resize the video content, change a frame rate of the video content, and/or remove noise from the video content.

In a prediction stage (block 206), the encoder 102 predicts pixel samples of a current block from neighboring blocks (e.g., by using intra prediction tools 220) and/or from temporally different frames/blocks (e.g., using inter prediction 222 or motion compensated prediction 224), or hybrid modes that use both inter and intra prediction. Other example prediction techniques include temporal interpolated prediction and weighted prediction.

The prediction stage reduces spatial and/or temporally redundant information in coding blocks from neighboring samples or frames, respectively. The resulting block of information after subtracting the predicted values from the block of interest may be referred to as a residual block. The encoder 102 then applies a transformation on the residual block using variants of the discrete cosine transform (DCT), discrete sine transform (DST), or other possible transformation. The block on which a transform is applied is often referred to as a transform unit (TU).

Further, in a transform stage (block 208), the encoder 102 provides energy compaction in the residual block by mapping the residual values from the pixel domain to some alternative Euclidean space. This transformation aims to generally reduce the number of bits required for the coefficients that need to be encoded in the bitstream.

In some implementations, an encoder can skip the transform stage 208. For example, the transform stage may be skipped in cases when the residual signal after prediction is compact enough and if performing a transform does not yield additional compression benefits.

The resultant coefficients are quantized using a quantizer stage (block 210), which reduces the number of bits required to represent the transform coefficients. Further, optimization techniques such as trellis-based quantization or dropout optimization or coefficient thresholding may be performed to tune the quantized coefficients based on some rate-distortion criteria to reduce bitrate.

Quantization can also cause loss of information, particularly at low bitrate constraints. In such cases, quantization may lead to a visible distortion or loss of information in images/video. The tradeoff between the rate (e.g., the number of bits sent over a time period), and distortion may be controlled with a quantization parameter (QP).

In the entropy coding stage (block 212), the quantized transform coefficients, which usually make up the bulk of the final output bitstream, are signaled to the decoder using lossless entropy coding methods such as multi-symbol arithmetic coding or context-adaptive binary arithmetic coding (CABAC).

Certain encoder decisions may be signed to the decoder by encoding context information in the bitstream. As an example, contextual information (also referred to as side information) can indicate partitioning types, intra and inter prediction modes (e.g., weighted intra prediction, multi-reference line modes, etc.), a transform type applied to transform blocks, a position of the last coded coefficient in a TU and or other flags/indices pertaining to tools such as a secondary transform. The decoder can use this signaled information to perform an inverse transformation on the de-quantized coefficients and reconstruct the pixel samples. The output of the entropy coding stage is provided as the encoded content 114 (e.g., in the form of an output bit-stream).

In general, the decoding process is performed to reverse the effects of the encoding process. As an example, an inverse quantization stage (block 214) may be used to reverse the quantization applied by the quantization stage 210. An inverse transform stage (block 216) may be used to reverse the transformation applied by the transform stage 208 to obtain the frames of the original video content 202 (or approximations thereof).

Restoration and loop-filters (block 218) may be used on the reconstructed frames (e.g., after decompression) to further enhance the subjective quality of reconstructed frames. This stage can include de-blocking filters to remove boundary artifacts due to partitioning, and restoration filters to remove other artifacts, such as quantization and transform artifacts. The output of the loop filter is provided as the decoded data 116 (e.g., in the form of video content 226, such as a sequence of images, frames, or video pictures).

The blocks 202a of the input frame 202 may be called coding units (CUs) in HEVC and VVC and prediction units (PUs), also called macroblocks, in AV1. After this partitioning stage, the prediction is generally carried out by choosing one among multiple intra and inter prediction modes in order to exploit spatial and temporal redundancies between blocks. The encoder can predict pixels of a current block from neighboring blocks (e.g., by using intra prediction tools) and/or from temporally different frames/blocks (e.g., using inter prediction/motion compensated prediction), or hybrid modes that use both inter and intra prediction. These coding blocks (CUs/PUs) may be further split into transform units (TUs). Thus, the residual blocks are obtained by subtracting the predicted values from the block of interest. The encoder then applies a transformation on the residual block to generate transform coefficients that are quantized before entropy coding.

In AVC, HEVC, and VVC, the context-adaptive binary arithmetic coding (CABAC) may include the entropy coding engine. CABAC includes probability estimation and code-word mapping. The codeword mapping is performed by the binary arithmetic coding engine. The probability estimation is carried out by adaptively updating the probability values for each context (e.g., probability model for a binary symbol) associated with different syntax elements.

While AVC and HEVC may use a similar CABAC engine, VVC allows a more flexible probability estimation approach in CABAC. For example, for each context for entropy coding for VVC, two separate probability estimates are maintained, and the average of the two is used to derive the probability value.

Entropy coding in AV1 also includes probability estimation and codeword mapping steps. Entropy coding in AV1 employs multi-symbol (e.g., M-ary) arithmetic coding. Thus, the probability estimation is performed for multiple symbols, denoted by $s_0, s_1, \ldots, s_{M-1}$, whose probabilities are represented in terms of cumulative distribution functions (CDFs). For a group of M symbols (in case of M-ary arithmetic coding), the CDF for the k-th symbol $(c_k)$ is a cumulative sum of probability values up to and including symbol $s_k$ as stated below:

$$c_k = \sum_{i=0}^{k} p_i \text{ for } k = 0, 1, \dots, M-1 \tag{1}$$

where $p_i$ denotes the probability value corresponding to symbol $s_i$. The CDF fully represents the probability of a group of symbols where, the probability of each symbol may be calculated as:

$$p_0 = c_0 \text{ (for } k = 0) \tag{1.1}$$

$$p_k = (c_k - c_{k-1}) \text{ for } k = 1, \dots, M-1$$

In AV1/AVM, the CDF values are represented using 15-bit unsigned integers, obtained by scaling the actual probability range [0, 1] by $2^{15}$. Therefore, $p_{max}=2^{15}$, which is equal to 32768 and corresponds to the maximum probability value of 1. By definition, the last CDF element (e.g., k=M−1) is always equal to 32768 for all M. Moreover, AV1 supports M-ary symbols of 13 different lengths, where M may be 2, 3, 4, 5, 6, 7, 8, 9, 10, 11, 12, 15, or 16. Note that M=2 is a special case where symbols are binary as in CABAC.

For M-ary (multi-symbol) arithmetic coding, the probabilities assigned for M symbols may be represented in the following vector:

$$p(t) = [p_0(t), p_1(t), \dots, p_{M-1}(t)] \tag{1.2}$$

and corresponding CDF values are in the vector $$c(t) = [c_0(t), c_1(t), \dots, c_{M-1}(t)]. \tag{1.3}$$

In general, the probability estimation step in an entropy coding engine may be formulated as the following generic update formula:

$$p(t) = f_p(s_k, p(t-1), \mu) \tag{2}$$

where the probability vector at time step t, denoted by p(t), is a function $(f_p)$ of the probability at the previous step (p(t−1)) and the adaptivity rate u for an observed symbol at index k (e.g., $s_k$) at time t−1. Similarly the same generic formula applies to CDF updates as follows:

$$c(t) = f_{sc}(s_k, c(t-1), \mu) \tag{3}$$

where the vector of CDF values in c(t) is updated using previous CDF values c(t−1).

As a specific example of the update function $f_c$ in (3), the update formula in AV1/AVM may be written in terms of CDFs as:

10

$$c_i(t) = \begin{cases} c_i(t-1) - \mu \cdot c_i(t-1) & i < k \\ c_i(t-1) + \mu \cdot (p_{max} - c_i(t-1)) & i \geq k \end{cases} \tag{4}$$

where $p_{max}=2$, k denotes the index of the coded symbol element (e.g., index of symbol $s_k$) and i corresponds to the index of the CDF element associated with the i-th symbol as in (1).

In AVM, the adaptivity rate $\mu$ in (4) depends on the number of symbols in the group (M) and the counter value, reflecting the number of coded symbols in the group. The following formula is used to derive $\mu$:

$$\mu(r_C, r_M) = \left(2^{3+r_C(n)+r_M(m)}\right)^{-1} \tag{5}$$

where $r_C(n)$ and $r_M(m)$ are formulated as:

$$r_C(n) = \begin{cases} 0 & \text{if } n \leq 15 \\ 1 & \text{if } 15 < n \leq 31 \\ 2 & \text{if } n > 31 \end{cases} \text{ and } r_M(m) = \begin{cases} 1 & \text{if } m = 2 \text{ or } 3 \\ 2 & \text{otherwise} \end{cases} \tag{6}$$

such that $r_C(n)$ is a function of n denoting the number of coded symbols in the encoding/decoding process, and $r_M(m)$ is a function of the number of symbols in the group. Note that in Equation (5), larger values of $r_C(n)$ and $r_M(m)$ lead to smaller $\mu$ so that it results in a slower adaptation rate. On the contrary, smaller values of $r_C(n)$ and $r_M(m)$ lead to faster adaptation rate in the probability estimation.

As previously discussed, the various methods for improving the coding efficiency of entropy coding discussed herein provide flexible adaptation methods in probability estimation. While some examples and embodiments described herein are related to AV1/AVM specifications, the concepts and related examples may be extended or applied to any image/video coding standard/system that supports a multi-symbol (M-ary) or binary entropy coding.

Figure 3A:
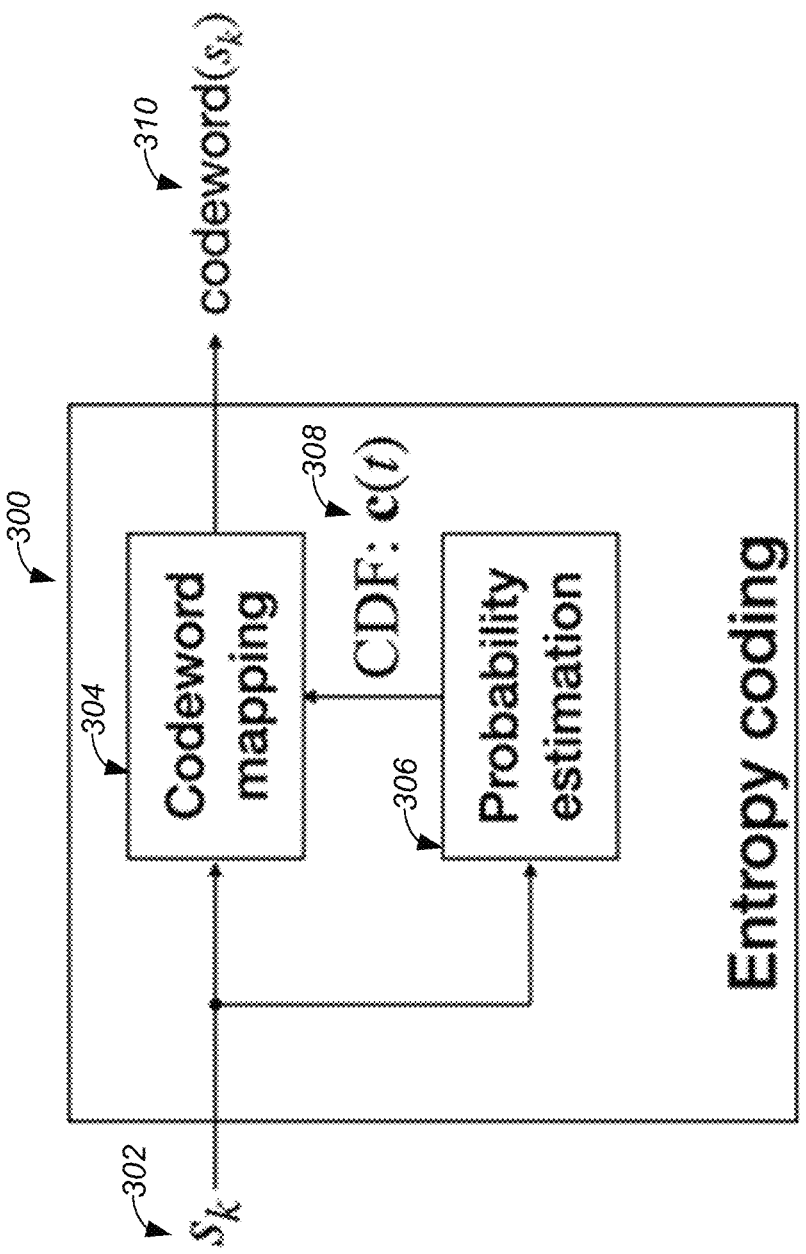
FIG. 3A is a diagram of example encoding operations for entropy coding.
Figure 3B:
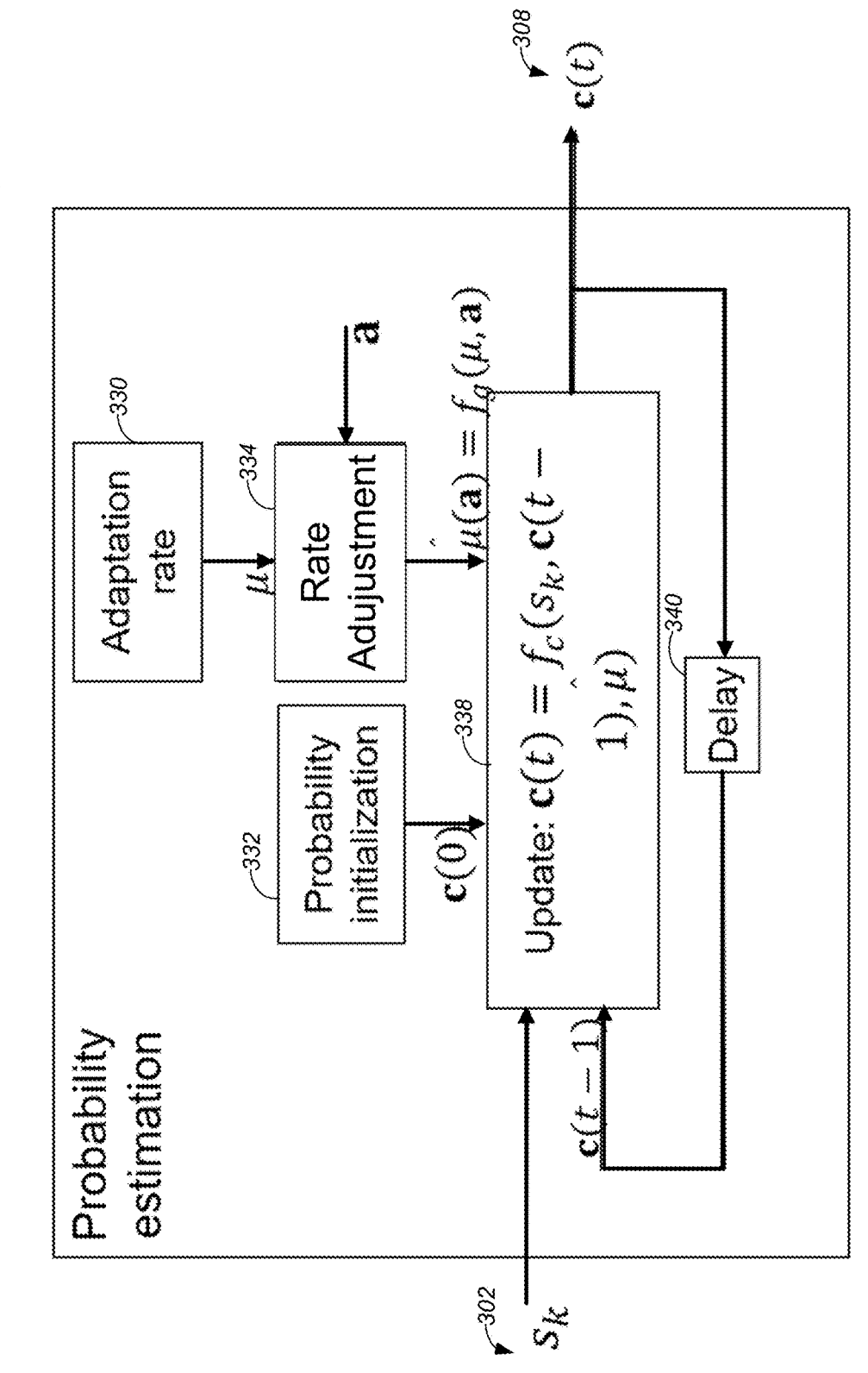
FIG. 3B is a diagram of example encoding operations for probability estimation.
Figure 3C:
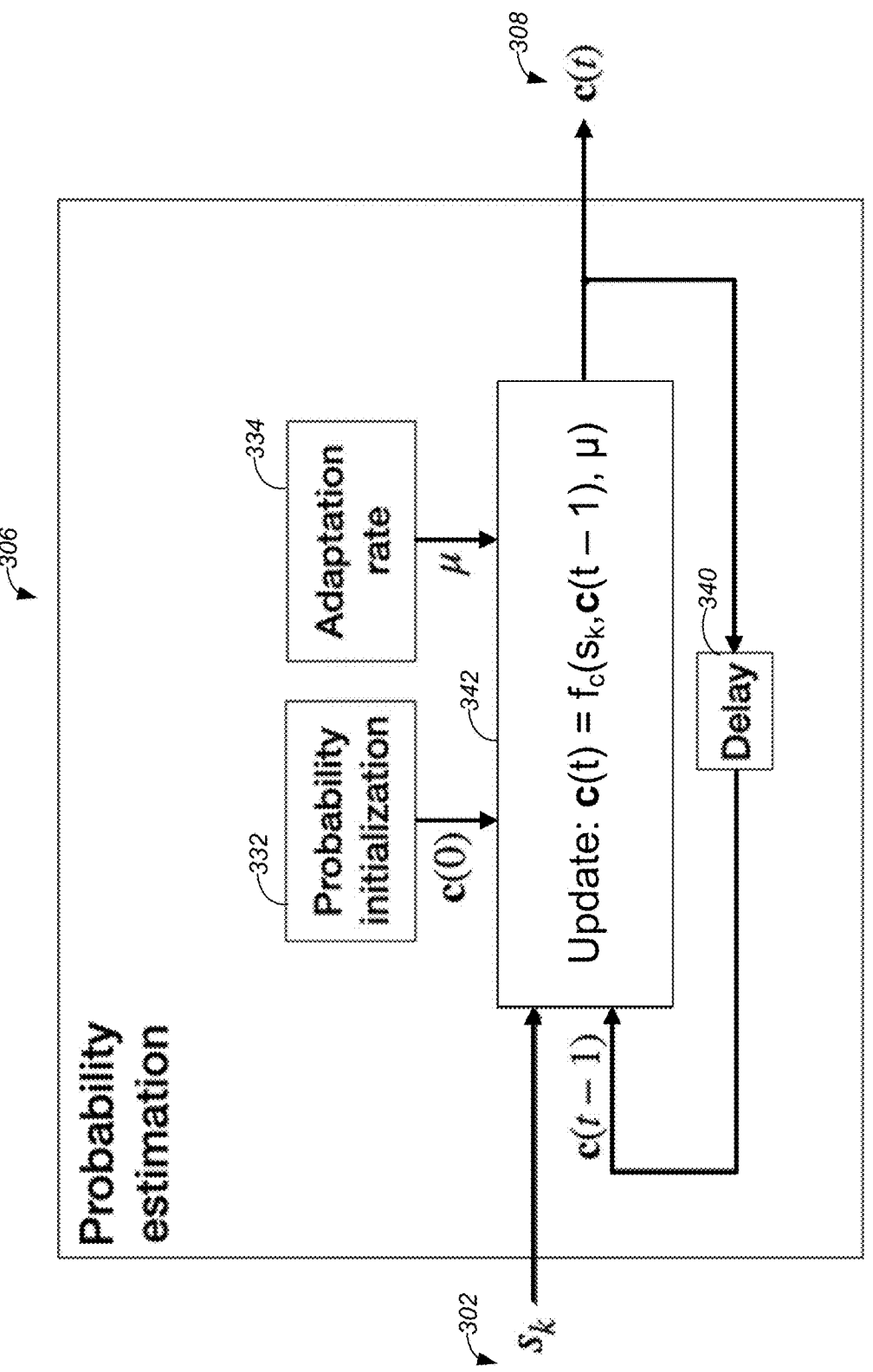
FIG. 3C is a diagram of example encoding operations for probability estimation.

FIG. 3A illustrates an entropy coding engine 300. Input data 302 are provided to the entropy coding engine 300, and output codewords 310 are generated from these input data. The coding engine 300 includes a codeword mapping engine 304 and a probability estimation engine 306. Two aspects described herein are for the probability estimation stage of the probability estimation engine 306. In a first aspect, a probability adaptation rate adjustment (PARA) introduces the rate adjustment step modifying the rate adaptation in the probability estimation, as illustrated in FIG. 3B and further described in greater detail. A second aspect includes a windowed probability update (WPU) process that is related to the update step of the probability estimation, as shown in FIG. 3C and further described in greater detail. Intermediate data 308 are provided from the probability estimation engine 306 to the codeword mapping engine 304, as discussed in relation to FIGS. 3B-3C.

FIG. 3B shows a probability adaptation rate adjustment (PARA) process of the probability estimation engine 306. Probability adaptation rate adjustment introduces a set of parameters (e.g., a single or a plurality of parameters) in an entropy coding engine to adjust/modify the rate parameter in the generic update formula in Equation (2) or the formula in Equation (3) used in probability estimation.

In an entropy coding engine 300, the rate parameter $\mu$ may be adjusted/modified based on a predefined mathematical operation as follows. For scaling, for a given adjustment parameter «, the rate parameter may be modified by scaling $\mu$ as $\hat{\mu}=\alpha\cdot\mu$. The adjustment parameter may be a nonnegative real value, or a nonnegative integer value. For adding offset (bias), the adjustment parameter $\alpha$ may be used as an offset added on the rate parameter $\mu$ so that the adjusted rate parameter is $\hat{\mu}=\mu+\alpha$. The adjustment parameter may be a negative or nonnegative integer value. The adjustment parameters $\alpha_1$ and $\alpha_0$ may be used to derive the adjusted rate parameter as $\hat{\mu}=\alpha_1\mu+\alpha_0$ in an affine transform combining scaling and an additive offset.

The adjustment to the rate parameter $\mu$ may be written in the form of a mapping function $f_g(\bullet)$ such that $\hat{\mu}=f_g(\mu)$. The mapping can also be parametric $\mu(a)=f_g(\mu, a)$ where $a=[\alpha_0, \alpha_1, \ldots, \alpha_N]$ with N adjustment parameters.

The estimation can be performed with the rate adjustment engine 334 using entropy coding with probability adaptation rate adjustment by engine 330. In AV1/AVM, for the adaptivity rate $\mu(r_C, r_M)$ stated in Equation (5), the adjustment parameter $\alpha$ may be used to modify $\mu(r_C, r_M)$ as $\hat{\mu}(r_C, r_M, \alpha)=(2^{R+\alpha})^{-1}$, where $R=3+r_C(n)+r_M(m)$, and $\alpha$ is added to the exponent as an offset. A delay engine 340 ensures that the output is corresponding to previously coded frames or neighboring blocks.

For an integer $\alpha$, the adjusted rate $\hat{\mu}(r_C, r_M, \alpha)$ may be implemented efficiently using bitwise operations since it may be stated in terms of powers of two. Specifically, the multiplications in the CDF update Equation (4) may be implemented using right-shift operator (»), by replacing the multiplication term $\mu\cdot x$ with $x$»$(R+\alpha)$ as follows:

$$c_i(t) = \begin{cases} c_i(t-1) - (c_i(t-1) >> (R+\alpha)) & i < k \\ c_i(t-1) + ((p_{max} - c_i(t-1)) >> (R+\alpha)) & i \geq k \end{cases} \quad (7)$$

where $R=3+r_C(n)+r_M(m)$ and $p_{max}=2^{15}$.

A codec may determine the adjustment parameter used for probability estimation with an index to a look-up-table (LUT). For example, the adjustment parameter $\alpha$ may be restricted to one of the values in $\{0, -1, -2, 1, 2\}$ so that the indices $[0, 1, 2, 3, 4]$ correspond to $[0, -1, -2, 1, 2]$. In this setup, setting $\alpha$ to 0 leads to the original (e.g., default) probability estimator in (4) with adaptivity rate stated in Equation (5).

The probability adaptation rate adjustment of engine 334 may be applied at different levels of flexibility and granularity in a video/image codec. In an aspect, for fixed modeling, a rate adjustment parameter may be fixed so that it is part of the initial probability model known at the decoder (normatively) in addition to the probability/CDF initialization values.

In one embodiment, a single adjustment parameter may be used for all context coded syntax elements (e.g., symbols) defined in a codec. For example, the adjustment parameter may be set to $-1$ to increase the speed of adaptation in (7), or $\alpha$ may be set to $+1$ to have a slower adaptation for all syntax elements.

In one embodiment, different adjustment parameters may be used for different groups of symbols (collection of different context sets). In one example, three separate adjustment parameters $\alpha^{(0)}$, $\alpha^{(1)}$ and $\alpha^{(2)}$ may be associated with different syntax elements. In a specific example, $\alpha^{(0)}$ may be used for syntax elements related to coefficient coding, $\alpha^{(1)}$ may be associated with motion vector related syntax elements, and $\alpha^{(2)}$ may be used for coding mode information or any other syntax elements.

In one embodiment, separate adjustment parameters may be used for each group of symbols/contexts defined in a codec. For example, in a codec with N group of symbols, N separate adjustment parameters, $\alpha^{(0)}$, $\alpha^{(1)}$, $\ldots$, $\alpha^{(N-1)}$ may be assigned to each group. In this case, the design allows rate adjustment per symbol/context group.

In AV1/AVM, the probability values of a symbol group are initialized using a list of initial CDF values as $[c_0^{(n)}, \ldots, c_{M-1}^{(n)}]$ where n denotes the index of a symbol group, and M is the number of symbols for group n. An initialization engine 332 can perform the probability initialization. The adjustment parameters may also be appended to the CDF initialization table associated with symbol group n as $[c_0^{(n)}, \ldots, c_{M-1}^{(n)}, \alpha^{(n)}]$ for $n=0, 1, \ldots, N$. Accordingly, the update formula in Equation (7), shown in update engine 338, may be extended as follows:

$$c_i(t) = \begin{cases} c_i(t-1) - (c_i(t-1) >> (R+\alpha^{(n)})) & i < k \\ c_i(t-1) + ((p_{max} - c_i(t-1)) >> (R+\alpha^{(n)})) & i \geq k \end{cases} \quad (7.1)$$

where $\alpha$ is replaced by $\alpha^{(n)}$ that is initialized per-symbol group.

In one embodiment, separate adjustment parameters may be assigned for each symbol (each context) defined in a codec. In this case, the design allows rate adjustment per symbol (e.g., per context).

In AV1/AVM, per-symbol adjustment parameters may be appended to the CDF initialization tables as $[c_0^{(n)}, \ldots, c_{M-1}^{(n)}, \alpha_0^{(n)}, a^{(n)}_{M-1}]$. The update formula in Equation (7) may be changed to support per-symbol adaptivity as follows:

$$c_i(t) = \begin{cases} c_i(t-1) - (c_i(t-1) >> (R+\alpha_k^{(n)})) & i < k \\ c_i(t-1) + ((p_{max} - c_i(t-1)) >> (R+\alpha_k^{(n)})) & i \geq k \end{cases} \quad (7.2)$$

where the adjustment parameter $\alpha_k^{(n)}$ depends on the coded symbol $s_k$ (e.g. the k-th symbol).

In a codec, a collection of adjustment parameters associated with different symbols may share the same value. For example, $\alpha^{(0)}=\alpha^{(1)}=1$, $\alpha^{(2)}=2$ and $\alpha^{(3)}=-1$, where $\alpha^{(0)}$ and $\alpha^{(1)}$ share the same adjustment value. In a sample codec with lookup table $[0, -1, -2, 1, 2]$, with corresponding indices in $[0,1,2,3,4]$, index 3 is used to indicate $\alpha^{(0)}=\alpha^{(1)}=1$, index 4 indicates $\alpha^{(2)}=2$ and index 1 indicates $\alpha^{(3)}=-1$.

The distinct set of adjustment parameters may be assigned depending on the number of coded symbols in a symbol group. For example, a codec may choose to have a faster adaptation rate (e.g., by setting $\alpha=-1$ or $\alpha=-2$) in the beginning of the coding process, while a slower adaptation rate is set (e.g., by setting $\alpha=1$ or $\alpha=2$) as the coding progresses.

In general, a codec may define L non-overlapping time intervals, denoted by $T_0, T_1 \ldots, T_{L-1}$, progressively, and L separate rate adjustment parameters, denoted by $\alpha_{T0}, \alpha_{T1}, \ldots, \alpha_{TL-1}$, may be assigned to each time interval, respectively. A codec may further support adaptivity per-symbol group so that adjustment parameters may be appended to CDF initialization as $[c_0^{(n)}, \ldots, c_{M-1}^{(n)}, (\alpha_{T0}^{(n)}, \alpha_{T1}^{(n)}, \ldots, \alpha_{TL-1}^{(n)})]$ for all symbol groups $n=0, 1 \ldots, N-1$. Accordingly, at the time interval $T_1$, the update formula in Equation (7) may be changed to support per-symbol adaptivity as follows:

$$c_i(t) = \begin{cases} c_i(t-1) - \left(c_i(t-1) >> \left(R + \alpha_{T_i}^{(n)}\right)\right) & i < k \\ c_i(t-1) + \left((p_{max} - c_i(t-1)) >> \left(R + \alpha_{T_i}^{(n)}\right)\right) & i \geq k \end{cases} \quad (7.3)$$

where the adjustment parameter $\alpha_{T1}^{(n)}$ depends on the context group index n and the time interval $T_1$, that is derived based on the counter value for that context group. The counter-based derivation for time intervals may be stated as:

$$\text{time interval} = \begin{cases} T_0 & \text{if count} \leq t_0 \\ T_1 & \text{if } t_0 < \text{count} \leq t_1 \\ \vdots & \vdots \\ T_l & \text{if } t_{l-1} < \text{count} \leq t_l \\ \vdots & \vdots \\ T_{L-1} & \text{if count} > t_{L-1} \end{cases} \quad (8)$$

where count refers to the symbol count, and $t_0 < t_1 < \ldots < t_l < \ldots < t_{L-1}$ denote the thresholds used to define the time intervals.

In AV1, 5-bit counters are used to count the number of coded symbols to derive $r_C(n)$ in Equation (5). A separate rate adjustment may be assigned to different time intervals defined based on the counter value. In an example, the same set of counter thresholds in $r_C(n)$ as stated in Equation (6) may be used to define three time intervals ($T_0$, $T_1$ and $T_2$), for each of which separate rate adjustment parameters ($\alpha_{T0}$, $\alpha_{T1}$ and $\alpha_{aT2}$) may be assigned. In AV1/AVM, for the time intervals $T_0$, $T_1$ and $T_2$, triplets of adjustment parameters per-symbol group ($\alpha_{T0}^{(n)}$, $\alpha_{T1}^{(n)}$, $\alpha_{T2}^{(n)}$ may be appended to CDF initialization tables as $[c_0^{(n)}, \ldots, c_{M-1}^{(n)}, (\alpha_{T0}^{(n)}, \alpha_{T1}^{(n)}, \alpha_{T2}^{(n)})]$ so that the adjustment parameters $\alpha_{T0}^{(n)}, \alpha_{T1}^{(n)}, \alpha_{T2}^{(n)}$ may be used depending on the time interval derived from the counter associated with symbol group n.

For this example, the time interval derivation in Equation (8) may be restated by setting $t_0=15$ and $t_1=3$ as follows:

$$\text{time interval} = \begin{cases} T_0 & \text{if count} \leq 15 \\ T_1 & \text{if } 15 < \text{count} \leq 31 \\ T_2 & \text{if count} > 31 \end{cases} \quad (9)$$

A codec may define a lookup table listing all possible adjustment parameter configurations, and an index value may be appended to the CDF initialization tables as $[c_0^{(n)}, \ldots, c_{M-1}^{(n)}, idx]$ where idx denotes the index to a lookup table. In a specific example, the adjustment parameters $\alpha_{T0}^{(n)}, \alpha_{T2}^{(n)}, \alpha_{T2}^{(n)}$ may be set to one of 5 possible values in {0, −1, −2, 1, 2} and three separate adjustment parameters may be supported for each time interval $T_0$, $T_1$ and $T_2$. This creates $5^3=125$ possible adjustment configurations. To efficiently represent, a lookup table with 125 entries may be defined in a codec where the idx in $[c_0^{(n)}, \ldots, c_{M-1}^{(n)}, idx]$ may be represented in 7 bits (covering up to 128 candidates).

In general, multi-bit counters may be used to count the number of coded symbols to support larger threshold values in Equation (8). As generally stated in Equation (8), the thresholds and counter values may be larger than 32 and this would require a counter with bit-depth larger than 5.

Different update rules can apply. The adjustment parameter may be the only parameter to control the adaptation rate as:

$$c_i(t) = \begin{cases} c_i(t-1) - (c_i(t-1) >> \alpha) & i < k \\ c_i(t-1) + ((p_{max} - c_i(t-1)) >> \alpha) & i \geq k \end{cases} \quad (9.1)$$

where $R=3+r_C(n)+r_M(m)$ in (7) may be combined into $\alpha$ whose values depend on n and m (counter and number of symbols in the group). The adjustment parameter $\alpha$ may be applied to one of the following three update formulas that perform different rounding for the updated $c_i(t)$:

$$c_i(t) = \begin{cases} ((c_i(t-1) << \alpha) - c_i(t-1)) >> \alpha & i < k \\ ((c_i(t-1) << \alpha) + (p_{max} - c_i(t-1))) >> \alpha & i \geq k \end{cases} \quad (9.2)$$

$$c_i(t) = \begin{cases} (c_i(t-1) - ((c_i(t-1) + 1) << (\alpha - 1)) >> \alpha) & i < k \\ (c_i(t-1) + ((p_{max} - c_i(t-1)) + 1) << (\alpha - 1)) >> \alpha) & i \geq k \end{cases}$$

$$c_i(t) = \begin{cases} ((c_i(t-1)) << \alpha) - (c_i(t-1) + 1) << (\alpha - 1))) >> \alpha & i < k \\ ((c_i(t-1)) << \alpha) + (p_{max} - (c_i(t-1) + 1)))) >> \alpha & i \geq k \end{cases}$$

In one example, different update formulas may be used for different symbol elements (per-symbol or group of symbols). In another example, the update formula may be signaled at different levels of coding. It may be signaled on a per-frame, per-subpicture, per-tile, per-slice, or per-sequence basis.

An adjustment parameter or multiple adjustment parameters may be signaled at different levels of coding hierarchy. Multiple or a group of adjustment parameters may be indicated by signaling an index corresponding to a look-up-table of adjustment parameters. The signaling may be carried out by using delta values (instead of index values) added on existing, pre-defined adjustment parameters.

In some implementations, a single adjustment parameter or multiple parameters (or associated delta values) may be signaled at the frame level. Instead of signaling the actual adjustment parameters, a codec may signal an index or multiple indices pointing to a table of adjustment parameters on a per-frame basis. In one example, adjustment parameter may be signaled as part of the picture parameter set (PPS), existing in some video coding standards.

In some implementations, a single adjustment parameter or multiple parameters (or associated delta values) may be signaled at the sequence level. Instead of signaling the actual adjustment parameters, a codec may signal an index or multiple indices pointing to a table of adjustment parameters on a per-sequence basis. In one example, adjustment parameter may be signaled as part of the sequence parameter set (SPS), existing in some video coding standards. In another example, the adjustment parameter signaling may be done at a frame, subpicture, tile, slice, or a group-of-picture (GoP) level. The parameter signaling may be allowed in the beginning of a group of pictures, such as in I-frames, key frames, or IDR (instantaneous decoder refresh) frames. In another example, the signaling may be allowed in the beginning of each tile. In another example, the signaling may be allowed in the beginning of a row of superblocks (SBs) or coding-tree-units (CTUs). Moreover, the signaling may be allowed at the beginning of a wavefront (used for parallel processing in some video coding standards).

In some implementations, entropy slice, which is independent of existing high-level picture partitions such as tiles, subpictures, and slices, may be introduced to signal and refresh adjustment parameters at different locations of a frame. In one example, the entropy slice may correspond to every row/column of SBs/CTUs. This is introduced so that the signaling is allowed at the beginning of each row/column, regardless of how other high-level picture partitions (e.g., subpictures, tiles, and slices) are applied.

A multi-pass encoder may find the best set of rate adjustment parameters by searching for the best adjustment configuration on the coded syntax elements. The search may be done on a per-frame, per-subpicture, per-tile, per-slice, per-GoP, or per-sequence basis, where the selected adjustment configuration is signaled. For the fixed modeling, the training for the best adjustment configuration may be performed offline.

In a codec, the adjustment parameters may be fixed for coding certain groups of symbols (contexts). For other symbol groups, the parameters may be signaled at the frame/subpicture/tile/slice/GoP/sequence level.

The adjustment parameters may depend on any side information available at the decoder. The side information may include coding modes, syntax elements, frame types and quantization parameters (QP or Q-index). In order to have a more flexible design, separate sets of adjustment parameters may be used depending on a collection of side information in the probability estimation process.

In one example, different adjustment parameters may be assigned for intra coded, inter coded, palette or intra-block-copy (IBC) coded blocks. In another example, different adjustment parameters may also be assigned for blocks that are coded with a transform skip flag or a skip mode decision.

In another example, separate adjustment parameters may be assigned to different ranges of QP (or q-index) values for a group of contexts (e.g., coefficient coding related syntax elements). The parameter switching may be performed at frame-level or block-level. In a specific example, the following index mapping for a given quantization parameter (q) may be used to derive the set_index:

$$
\text{set\_index}(q) = \begin{cases} 0 & \text{if } q \le 90 \\ 1 & \text{if } 90 < q \le 140 \\ 2 & \text{if } 140 < q \le 190 \\ 3 & \text{otherwise} \end{cases} \quad (9.3)
$$

where for each of the four index values (0, 1, 2, and 3), separate adjustment parameter(s) may be assigned. The number of QP-based sets/intervals and thresholds may be arbitrary in the general case.

In another example, separate adjustment parameters may be assigned for different types of slices/subpictures/frames/tiles such as I-slices (e.g., all-intra coded frames), B-slices, P-slices, key frames, compound coded frames, IDR (instantaneous decoder refresh) frames. Moreover, the adjustment parameters may be predicted/copied from previously coded frames as done in AV1/AVM for context probability initialization from previous frames.

In another example, different adjustment parameters may be assigned to coefficient related syntax in different residual coding schemes. For instance, one group of parameters may be assigned to coefficient syntax (e.g., level values and sign information) if the transform type is the identity transform (e.g. IDTX in AV1 or TS in VVC). In some video coding standards, this residual coding scheme is called as transform skip residual coding. Another set of adjustment parameters may be used for other coefficient syntax reserved for non-identity transforms such as 2D DCT, ADST, and so forth. Some syntax elements that may appear in these two residual coding schemes may be, coefficient level values, coefficient sign values, and last-position syntax (or end-of-block syntax).

In one embodiment, an encoder-only algorithm (e.g., a rate control algorithm) used in real-time communication, screen sharing and live streaming applications, including applications in video communication platforms, may modify or update the rate adjustment parameters. A rate control algorithm may determine if the PARA method applies faster/slower adaptation rules for relevant syntax elements or context. In one scenario, if the network bandwidth allows a rate control algorithm can slow down the adaptation rate or disable PARA-based adaptation. A rate control algorithm may also update the adaptation parameters to make probability updates faster/slower depending on the target bitrate.

In one example, a rate control algorithm may control adaptation rate for all syntax elements and contexts. For instance, a faster adaptation may be used at lower bitrates. At larger rates, the PARA method may be disabled, and a default rate adaptation may be used.

In another example, a rate control algorithm may have access to control a specific set of syntax elements/contexts and assign different adaptation strategies for those specific set of syntax elements. For instance, a rate control algorithm may only configure syntax elements related to coefficient coding. In one example, the rate adaptation due to rate control may be signaled for individual syntax elements or groups of syntax elements to identify which syntax elements may be controlled by the rate control algorithm.

The decision to enable rate control related adaptation may be achieved with using high-level syntax elements providing an interface between the PARA method and the underlying applications. The high-level signaling may be signaled at the frame/subpicture/tile/slice/GoP/sequence level.

In one example, PARA method may be enabled if error-resilient encoding mode is selected (e.g., denoted by error_resilient_mode in AV1). In one example, separate adjustment parameters may be assigned particularly for lossless/near-lossless coding. For instance, HEVC has a trans-quant-bypass mode enabling lossless coding at the coding block level. Likewise, VVC has a transform skip mode and QP thresholding to decide whether a block should be coded in a lossless mode. In these cases, a separate adjustment parameter may be assigned for syntax elements if lossless/near-lossless coding is performed. In one example, a set of adjustment parameters ($a^{(1)}$) assigned to a group of syntax elements may depend on another set of adjustment parameters ($a^{(2)}$) associated with another group of symbols or syntax elements.

The coefficient coding process in AV1 and the AVM transmits coefficient magnitude (level) values incrementally using different syntax elements in multiple coding passes. A base level coding pass in AV1 transmits level values between the range of [0, 4) using a syntax coeff_base. If the actual level value is greater than 4, AV1 performs another pass to transmit levels between [4, 12] using a separate syntax element coeff_br. In this case, adjustment parameters in $a^{(1)}$ used for coeff_base may also change the adjustment parameters in $a^{(2)}$ for coeff_br.

FIG. 3C shows a probability estimation module, where this disclosure introduces windowed probability update (WPU) process for the probability update engine 342. The windowed probability update process uses a subset of probability or CDF values in the probability estimation step of a multi-symbol (M-ary) entropy coding.

For the probability values assigned for M symbols as $$
p(t) = \left[ p_0^{(t)}, p_1^{(t)}, \dots, p_{M-1}^{(t)} \right] \quad (9.4)
$$

with the corresponding CDF values in the vector $$
c(t) = \left[ c_0^{(t)}, c_1^{(t)}, \dots, c_{M-1}^{(t)} \right], \quad (9.5)
$$

the WPU defines a subset from the set of all indices $l_M=\{0, 1, \ldots, M-1\}$, called S, to determine which probability values are updated in (2) or CDF values in (3). The WPU also defines a window function $w_i(\bullet)$ for $i \in S$ used to map probability/CDF values associated with different index values.

In general, distinct subsets of indices $S_k$ for $k=0, 1, \ldots, M-1$ may be defined for each of symbols $s_0, s_1, \ldots, s_{M-1}$. In the context of AVM, the WPU method may be applied to the CDF update rule for $s_k$ in Equation (4) as:

$$c_i(t) = \begin{cases} w_i(c_i(t-1) - \mu \cdot c_i(t-1)) & i < k \\ w_i(c_i(t-1) + \mu \cdot (p_{max} - c_i(t-1))) & i \geq k \end{cases} \text{ for } i \in S_k \quad (10)$$

$$c_i(t) = c_i(t-1) \text{ for } i \notin S_k$$

where the windowed updates (using $w_i(\bullet)$ are only applied for indices in $S_k$ nd the probability is not updated for other indices (e.g., indices that are not in $S_k$).

The WPU may also define a normalization function $v_i(\bullet)$ to normalize indices that are not updated as:

$$c_i(t) = v_i(c_i(t-1)) \text{ for } i \notin S_k \quad (11)$$

while $w_i(\bullet)$ is used when the probability is updated as in (10).

In one embodiment, the set of indices in $S_k$ for a symbol $s_k$ may be defined based on a notion of neighborhood around symbol $s_k$. As a specific example, the $S_k$ may include two closest indices to k such that $S_k=\{k-1, k, k+1\}$. As another example, $S_k$ may include n closest indices to k.

In one embodiment, the indices defined based on nearest neighboring may be applied to coefficient coding related syntax elements (e.g., EOB coding, last position coding, level coding), while an arbitrary (non-neighbor based) index sets may define a window for other type of syntax elements. In one embodiment, an entropy coding engine may combine PARA and WPU methods, where the rate parameter $\mu$ in the windowed update (10) may be adjusted according to a PARA method.

The adjustment to the rate parameter $\mu$ may be written in the form of a generic mapping function $f_g(\bullet)$ such that $\hat{\mu}=f_g(\mu)$. The mapping can also be parametric $\hat{\mu}(a)=f_g(\mu, a)$ where $a=[\alpha_0, \alpha_1, \ldots, \alpha_{N-1}]$ with N adjustment parameters.

Fixed PARA modeling process, described previously, may be combined with WPU, where the rate adjustment step is part of the initial probability model known at the decoder (normatively) in addition to the probability/CDF initialization values.

A signaling-based PARA method process, described previously, may be combined with the WPU where an adjustment parameter or multiple adjustment parameters may be signaled at different levels of coding hierarchy. Multiple or a group of adjustment parameters may be indicated by signaling an index corresponding to a look-up-table of adjustment parameters. The signaling may be carried out by using delta values, instead of index values, which are added on existing, pre-defined adjustment parameters.

Example Processes

Figure 4B:
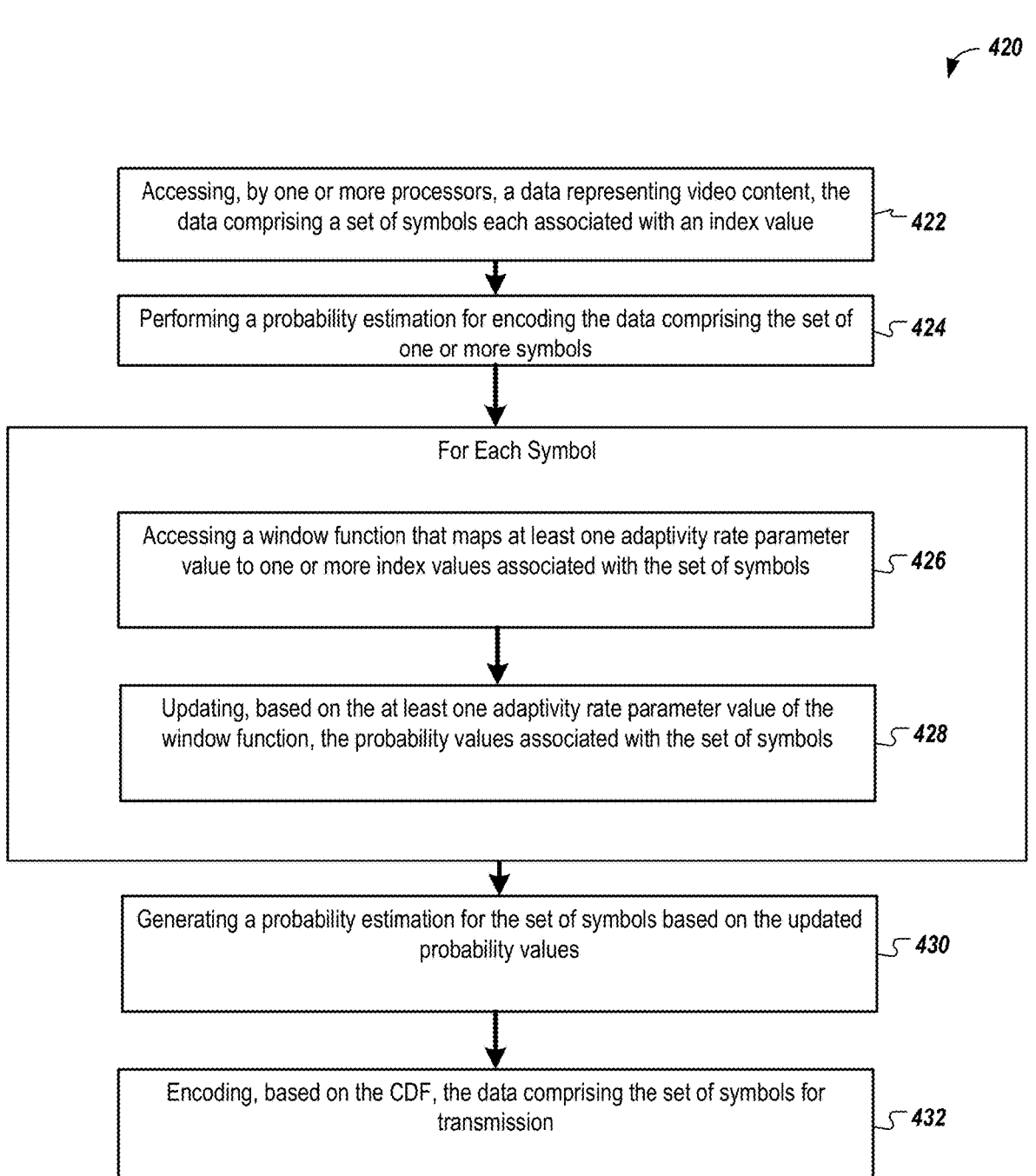

FIGS. 4A-4B each illustrate a respective example process 400, 420 for encoding video content. The processes 400, 420 may be performed, at least in part, using a system having an encoder and/or decoder (e.g., as shown in FIGS. 1, 2, and 3A-3C).

The process 400 of FIG. 4A includes accessing (402), by one or more processors, data representing video content, the data comprising a set of one or more symbols each associated with a syntax element. The process 400 includes performing (402) a probability estimation for encoding the data comprising the set of one or more symbols. The probability estimation includes, for each symbol, obtaining (406), based on the syntax element for that symbol, an adaptivity rate parameter value, the adaptivity rate parameter value being a function of a number of symbols in the set of one or more symbols. The probability estimation includes, for each symbol, updating (408) the adaptivity rate parameter value as a function of an adjustment parameter value. The probability estimation includes, for each symbol, generating (410), based on the updated adaptivity rate parameter value, a probability value. The probability estimation includes generating (412) a probability estimation for the set of one or more symbols based on the probability value for each symbol. The probability estimation includes a cumulative distribution function (CDF) representing a probability value for the set of one or more symbols. The process 400 includes encoding, (414) based on the CDF of the probability estimation, the data comprising the set of one or more symbols for transmission.

In some implementations, the process 400 includes adjusting the adaptivity rate parameter value based on a scaling function that multiples the adaptivity rate parameter value with the adjustment parameter value. In some implementations, the process 400 includes adjusting the adaptivity rate parameter value based on an offset function that adds the adaptivity rate parameter value to the adjustment parameter value. In some implementations, the process 400 includes adjusting the adaptivity rate parameter value based on an affine function that combines an offset function and a scaling function.

In some implementations, the process 400 includes selecting the adjustment parameter value for adjusting the adaptivity rate parameter value based on a predefined mapping table. In some implementations, the adjustment parameter value is set to a value of 0, −1, −2, 1, or 2, wherein the adjustment parameter value is part of a multiplier of the adaptivity rate parameter value.

In some implementations, the adjustment parameter value is based on a fixed model predefined for an encoder and a decoder configured to receive the encoded data comprising the set of one or more symbols. In some implementations, the fixed model specifies a single adjustment parameter value for all symbols including the set of one or more symbols. In some implementations, the set of one or more symbols comprises a plurality of symbols. The fixed model specifies a first adjustment parameter value for a first subset of the plurality of symbols associated with a first syntax element. The fixed model specifies a second adjustment parameter value for a second subset of the plurality of symbols associated with a second syntax element. The first adjustment parameter value can be different from the second adjustment parameter value. In some implementations, the fixed model specifies that an adjustment parameter value for a group of symbols including the set of one or more symbols. In some implementations, the fixed model specifies a different adjustment parameter value for each symbol in the set of one or more symbols that are associated with a respective different syntax element.

In some implementations, the adjustment parameter value is appended to a CDF initialization table associated with the set of one or more symbols.

In some implementations, the set of one or more symbols comprises a plurality of symbols, and wherein a set of adjustment parameter values associated with the plurality of symbols comprises at least two adjustment parameter values that have a same value.

In some implementations, at least one adjustment parameter value associated with the plurality of symbols is based on a number of coded symbols in the set of one or more symbols.

In some implementations, the process 400 includes receiving a time interval value associated with the set of one or more symbols. In some implementations, the process 400 includes setting the adaptivity rate parameter value based on the time interval value. In some implementations, the adaptivity rate parameter value for a time interval value is unique to that time interval. In some implementations, the adaptivity rate parameter value for the time interval value is further adjusted using a different adjustment parameter value for each symbol associated with the time interval value. In some implementations, the adaptivity rate parameter value for the time interval value is further adjusted using a same adjustment parameter value for all symbols in the set of one or more symbols associated with the time interval value.

In some implementations, the process 400 includes accessing, from a look-up table, a set of possible configurations for the adjustment parameter value, wherein the accessing is based on an index value for the look-up table, the index value being appended to a CDF initialization table.

In some implementations, the adjustment parameter value is specified for a video frame, a sub-picture, a slice, or a sequence associated with the set of one or more symbols.

In some implementations, the adjustment parameter value is specified for a particular block including an intra-coded block, an inter-coded block, a palette coded block, or an intra-block-copy (IBC) coded block associated with the set of one or more symbols.

In some implementations, the adjustment parameter value is based on a quantization parameter value associated with the set of one or more symbols.

In some implementations, the adjustment parameter value is updated for each intra-coded frame, each B-slice, each P-slice, each key frame, cach compound coded frame, or each instantaneous decoder refresh.

In some implementations, the adjustment parameter value is updated based on a residual coding scheme of the data comprising the set of one or more symbols.

In some implementations, the process 400 includes transmitting the encoded data in a real-time communication or live streaming application, wherein the real-time communication or live streaming application is configured to update the adjustment parameter value.

In some implementations, the process 400 includes selecting the adjustment parameter value for a lossless or near-lossless coding scenario.

In some implementations, the process 400 includes selecting the adjustment parameter value based on another adjustment parameter value for another symbol that is not in the set of one or more symbols.

The process 420 of FIG. 4B includes accessing (422), by one or more processors, data representing video content, the data comprising a set of symbols each associated with an index value. The process 420 includes performing a probability estimation for encoding the data comprising the set of one or more symbols. The probability estimation includes, for each symbol, accessing (426) a window function that maps at least one adaptivity rate parameter value to one or more index values associated with the set of symbols. The probability estimation includes, for each symbol, updating (428), based on the at least one adaptivity rate parameter value of the window function, the probability values associated with the set of symbols. The process 420 includes generating (430) a probability estimation for the set of symbols based on the updated probability values, the probability estimation comprising a cumulative distribution function (CDF). The process 420 includes encoding (432), based on the CDF, the data comprising the set of symbols for transmission.

In some implementations, the at least one adaptivity rate parameter value is applied only to the set of symbols associated with the window function. In some implementations, the window function defines a normalization parameter for normalizing symbols that are not associated with the window function.

Example Computer System

Figure 5:
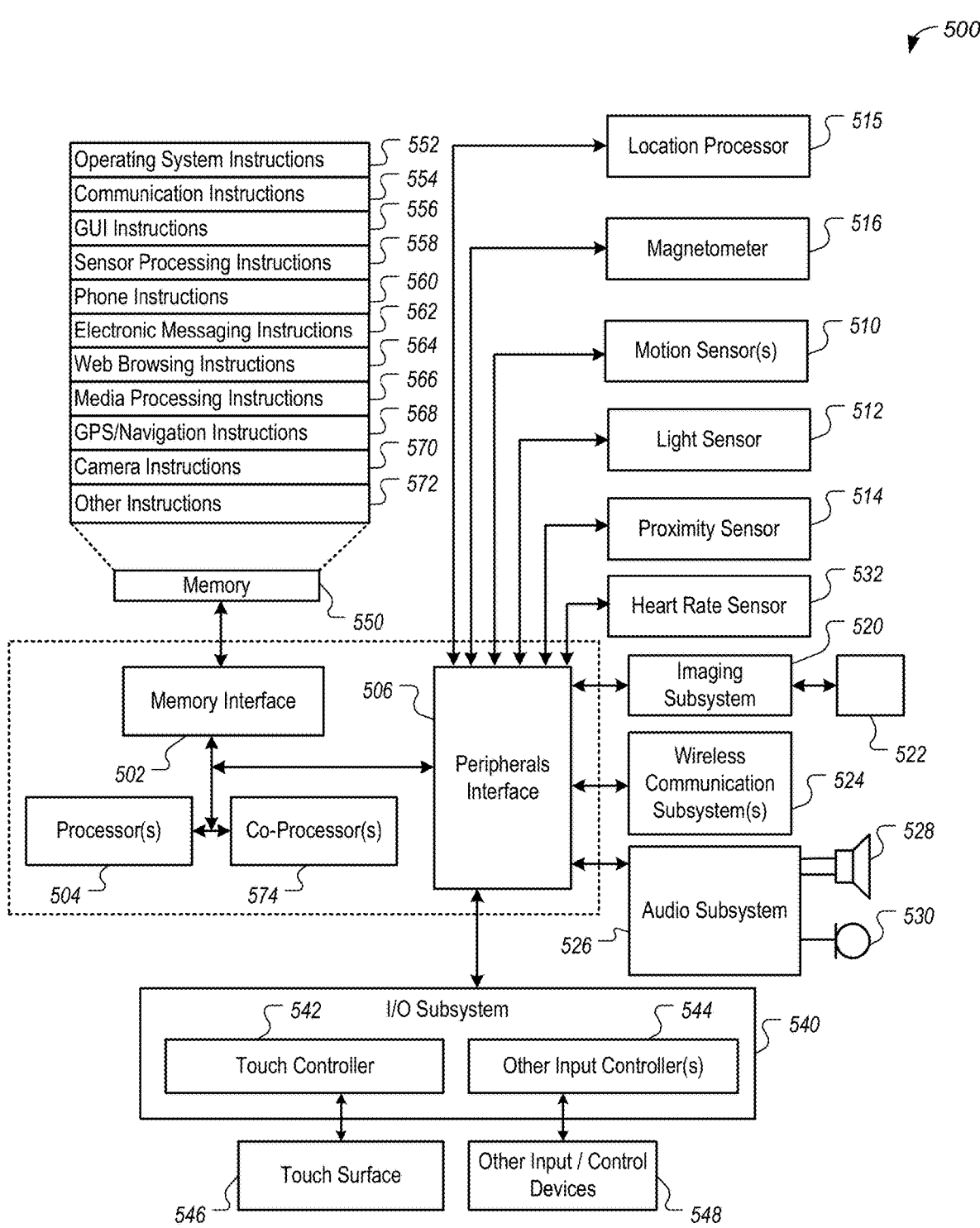
FIG. 5 is a diagram of an example device architecture for implementing the features and processes described in reference to FIGS. 1-4B.

FIG. 5 is a block diagram of an example device architecture 500 for implementing the features and processes described in reference to FIGS. 1-4B. For example, the architecture 500 may be used to implement the system 100 and/or one or more components of the system 100. The architecture 500 may be implemented in any device for generating the features described in reference to FIGS. 1-4B, including but not limited to desktop computers, server computers, portable computers, smart phones, tablet computers, game consoles, wearable computers, holographic displays, set top boxes, media players, smart TVs, and the like.

The architecture 500 can include a memory interface 502, one or more data processor 504, one or more data co-processors 574, and a peripherals interface 506. The memory interface 502, the processor(s) 504, the co-processor(s) 574, and/or the peripherals interface 506 may be separate components or may be integrated in one or more integrated circuits. One or more communication buses or signal lines may couple the various components.

The processor(s) 504 and/or the co-processor(s) 574 can operate in conjunction to perform the operations described herein. For instance, the processor(s) 504 can include one or more central processing units (CPUs) and/or graphics processing units (GPUs) that are configured to function as the primary computer processors for the architecture 500. As an example, the processor(s) 504 may be configured to perform generalized data processing tasks of the architecture 500. Further, at least some of the data processing tasks may be offloaded to the co-processor(s) 574. For example, specialized data processing tasks, such as processing motion data, processing image data, encrypting data, and/or performing certain types of arithmetic operations, may be offloaded to one or more specialized co-processor(s) 574 for handling those tasks. In some cases, the processor(s) 504 may be relatively more powerful than the co-processor(s) 574 and/or can consume more power than the co-processor(s) 574. This may be useful, for example, as it enables the processor(s) 504 to handle generalized tasks quickly, while also offloading certain other tasks to co-processor(s) 574 that may perform those tasks more efficiency and/or more effectively. In some cases, a co-processor(s) can include one or more sensors or other components (e.g., as described herein), and may be configured to process data obtained using those sensors or components and provide the processed data to the processor(s) 504 for further analysis.

Sensors, devices, and subsystems may be coupled to peripherals interface 506 to facilitate multiple functionalities. For example, a motion sensor 510, a light sensor 512, and a proximity sensor 514 may be coupled to the peripherals interface 506 to facilitate orientation, lighting, and proximity functions of the architecture 500. For example, in some implementations, a light sensor 512 may be utilized to facilitate adjusting the brightness of a touch surface 546. In some implementations, a motion sensor 510 may be utilized to detect movement and orientation of the device. For example, the motion sensor 510 can include one or more accelerometers (e.g., to measure the acceleration experienced by the motion sensor 510 and/or the architecture 500 over a period of time), and/or one or more compasses or gyros (e.g., to measure the orientation of the motion sensor 510 and/or the mobile device). In some cases, the measurement information obtained by the motion sensor 510 may be in the form of one or more a time-varying signals (e.g., a time-varying plot of an acceleration and/or an orientation over a period of time). Further, display objects or media may be presented according to a detected orientation (e.g., according to a "portrait" orientation or a "landscape" orientation). In some cases, a motion sensor 510 may be directly integrated into a co-processor 574 configured to processes measurements obtained by the motion sensor 510. For example, a co-processor 574 can include one more accelerometers, compasses, and/or gyroscopes, and may be configured to obtain sensor data from each of these sensors, process the sensor data, and transmit the processed data to the processor(s) 504 for further analysis.

Other sensors may also be connected to the peripherals interface 506, such as a temperature sensor, a biometric sensor, or other sensing device, to facilitate related functionalities. As an example, as shown in FIG. 5, the architecture 500 can include a heart rate sensor 532 that measures the beats of a user's heart. Similarly, these other sensors also may be directly integrated into one or more co-processor(s) 574 configured to process measurements obtained from those sensors.

A location processor 515 (e.g., a GNSS receiver chip) may be connected to the peripherals interface 506 to provide geo-referencing. An electronic magnetometer 516 (e.g., an integrated circuit chip) can also be connected to the peripherals interface 506 to provide data that may be used to determine the direction of magnetic North. Thus, the electronic magnetometer 516 may be used as an electronic compass.

An imaging subsystem 520 and/or an optical sensor 522 may be utilized to generate images, videos, point clouds, and/or other any other visual information regarding a subject or environment. As an example, the imaging subsystem 520 can include one or more still cameras and/or optical sensors (e.g., a charged coupled device [CCD] or a complementary metal-oxide semiconductor [CMOS] optical sensor) configured to generate still images of a subject or environment. As another example, the imaging subsystem 520 can include one or more video cameras and/or optical sensors configured to generate videos of a subject or environment. As another example, the imaging subsystem 520 can include one or more depth sensors (e.g., LiDAR sensors) configured to generate a point cloud representing a subject or environment. In some implementations, at least some of the data generated the imaging subsystem 520 and/or an optical sensor 522 can include two-dimensional data (e.g., two-dimensional images, videos, and/or point clouds). In some implementations, at least some of the data generated the imaging subsystem 520 and/or an optical sensor 522 can include three-dimensional data (e.g., three-dimensional images, videos, and/or point clouds).

The information generated by the imaging subsystem 520 and/or an optical sensor 522 may be used to generate corresponding polygon meshes and/or to sample those polygon meshes (e.g., using the systems and/or techniques described herein). As an example, at least some of the techniques described herein may be performed at least in part using one or more data processors 504 and/or one or more data co-processors 574.

Communication functions may be facilitated through one or more communication subsystems 524. The communication subsystem(s) 524 can include one or more wireless and/or wired communication subsystems. For example, wireless communication subsystems can include radio frequency receivers and transmitters and/or optical (e.g., infrared) receivers and transmitters. As another example, wired communication system can include a port device, e.g., a Universal Serial Bus (USB) port or some other wired port connection that may be used to establish a wired connection to other computing devices, such as other communication devices, network access devices, a personal computer, a printer, a display screen, or other processing devices capable of receiving or transmitting data.

The specific design and implementation of the communication subsystem 524 can depend on the communication network(s) or medium(s) over which the architecture 500 is intended to operate. For example, the architecture 500 can include wireless communication subsystems designed to operate over a global system for mobile communications (GSM) network, a GPRS network, an enhanced data GSM environment (EDGE) network, 802.x communication networks (e.g., Wi-Fi, Wi-Max), code division multiple access (CDMA) networks, NFC and a Bluetooth™ network. The wireless communication subsystems can also include hosting protocols such that the architecture 500 may be configured as a base station for other wireless devices. As another example, the communication subsystems may allow the architecture 500 to synchronize with a host device using one or more protocols, such as, for example, the TCP/IP protocol, HTTP protocol, UDP protocol, and any other known protocol.

An audio subsystem 526 may be coupled to a speaker 528 and one or more microphones 530 to facilitate voice-enabled functions, such as voice recognition, voice replication, digital recording, and telephony functions.

An I/O subsystem 540 can include a touch controller 542 and/or other input controller(s) 544. The touch controller 542 may be coupled to a touch surface 546. The touch surface 546 and the touch controller 542 can, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with the touch surface 546. In one implementation, the touch surface 546 can display virtual or soft buttons and a virtual keyboard, which may be used as an input/output device by the user.

Other input controller(s) 544 may be coupled to other input/control devices 548, such as one or more buttons, rocker switches, thumbwheel, infrared port, USB port, and/or a pointer device such as a stylus. The one or more buttons (not shown) can include an up/down button for volume control of the speaker 528 and/or the microphone 530.

In some implementations, the architecture 500 can present recorded audio and/or video files, such as MP3, AAC, and MPEG video files. In some implementations, the architecture 500 can include the functionality of an MP3 player and may include a pin connector for tethering to other devices. Other input/output and control devices may be used.

A memory interface 502 may be coupled to a memory 550. The memory 550 can include high-speed random access memory or non-volatile memory, such as one or more magnetic disk storage devices, one or more optical storage devices, or flash memory (e.g., NAND, NOR). The memory 550 can store an operating system 552, such as MACOS, IOS, Darwin, RTXC, LINUX, UNIX, WINDOWS, or an embedded operating system such as Vx Works. The operating system 552 can include instructions for handling basic system services and for performing hardware dependent tasks. In some implementations, the operating system 552 can include a kernel (e.g., UNIX kernel).

The memory 550 can also store communication instructions 554 to facilitate communicating with one or more additional devices, one or more computers or servers, including peer-to-peer communications. The communication instructions 554 can also be used to select an operational mode or communication medium for use by the device, based on a geographic location (obtained by the GPS/Navigation instructions 568) of the device. The memory 550 can include graphical user interface instructions 556 to facilitate graphic user interface processing, including a touch model for interpreting touch inputs and gestures; sensor processing instructions 558 to facilitate sensor-related processing and functions; phone instructions 560 to facilitate phone-related processes and functions; electronic messaging instructions 562 to facilitate electronic-messaging related processes and functions; web browsing instructions 564 to facilitate web browsing-related processes and functions; media processing instructions 566 to facilitate media processing-related processes and functions; GPS/Navigation instructions 569 to facilitate GPS and navigation-related processes; camera instructions 570 to facilitate camera-related processes and functions; and other instructions 572 for performing some or all of the processes described herein.

Each of the above identified instructions and applications can correspond to a set of instructions for performing one or more functions described herein. These instructions need not be implemented as separate software programs, procedures, or modules. The memory 550 can include additional instructions or fewer instructions. Furthermore, various functions of the device may be implemented in hardware and/or in software, including in one or more signal processing and/or application specific integrated circuits (ASICs).

The features described may be implemented in digital electronic circuitry or in computer hardware, firmware, software, or in combinations of them. The features may be implemented in a computer program product tangibly embodied in an information carrier, e.g., in a machine-readable storage device, for execution by a programmable processor; and method steps may be performed by a programmable processor executing a program of instructions to perform functions of the described implementations by operating on input data and generating output.

The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer may communicate with mass storage devices for storing data files. These mass storage devices may include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user the features may be implemented on a computer having a display device such as a CRT (cathode ray tube) or LCD (liquid crystal display) monitor for displaying information to the author and a keyboard and a pointing device such as a mouse or a trackball by which the author may provide input to the computer.

The features may be implemented in a computer system that includes a back-end component, such as a data server or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include a LAN, a WAN and the computers and networks forming the Internet.

The computer system may include clients and servers. A client and server are generally remote from each other and typically interact through a network. The relationship of client and server arises by virtue of computer programs running on the respective computers and having a client-server relationship to each other.

One or more features or steps of the disclosed embodiments may be implemented using an Application Programming Interface (API). An API may define on or more parameters that are passed between a calling application and other software code (e.g., an operating system, library routine, function) that provides a service, which provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

As described above, some aspects of the subject matter of this specification include gathering and use of mesh and point cloud data available from various sources to improve services a mobile device can provide to a user. The present disclosure further contemplates that to the extent mesh and point cloud data representative of personal information data are collected, analyzed, disclosed, transferred, stored, or otherwise used, implementors will comply with well-established privacy policies and/or privacy practices. In particular, such implementers should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such implementers would take any needed steps for safeguarding and securing access to such personal information data and ensuring that others with access to the personal information data adhere to their privacy policies and procedures. Further, such implementers can subject themselves to evaluation by third parties to certify their adherence to widely accepted privacy policies and practices.

A number of implementations have been described. Nevertheless, it will be understood that various modifications may be made. Elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. One or more processors configured to execute instructions for performing operations comprising:

accessing, by one or more processors, data representing video content, the data comprising a set of one or more symbols each associated with a syntax element;

performing a probability estimation for encoding the data comprising the set of one or more symbols, the probability estimation comprising:

for each symbol, obtaining, based on the syntax element for that symbol, an adaptivity rate parameter value, the adaptivity rate parameter value being a function of a number of symbols in the set of one or more symbols;

updating the adaptivity rate parameter value as a function of an adjustment parameter value, the function comprising an offset function, a scaling function, or a combination of the offset function and the scaling function, wherein the scaling function multiples the adaptivity rate parameter value with the adjustment parameter value, and wherein the offset function adds the adaptivity rate parameter value to the adjustment parameter value; and generating, based on the updated adaptivity rate parameter value, a probability value;

generating a probability estimation for the set of one or more symbols based on the probability value for each symbol, the probability estimation comprising a cumulative distribution function (CDF) representing a probability value for the set of one or more symbols; and encoding, based on the CDF of the probability estimation, the data comprising the set of one or more symbols for transmission.

2. The one or more processors of claim 1, further comprising adjusting the adaptivity rate parameter value based on an affine function that combines the offset function and the scaling function.

3. The one or more processors of claim 1, further comprising selecting the adjustment parameter value for adjusting the adaptivity rate parameter value based on a predefined mapping table.

4. The one or more processors of claim 1, wherein the adjustment parameter value is based on a fixed model predefined for an encoder and a decoder configured to receive the encoded data comprising the set of one or more symbols.

5. The one or more processors of claim 4, wherein the fixed model specifies a single adjustment parameter value for all symbols including the set of one or more symbols, wherein the fixed model specifies that an adjustment parameter value for a group of symbols including the set of one or more symbols, or wherein the fixed model specifies a different adjustment parameter value for each symbol in the set of one or more symbols that are associated with a respective different syntax element.

6. The one or more processors of claim 4, wherein the set of one or more symbols comprises a plurality of symbols, and wherein the fixed model specifies a first adjustment parameter value for a first subset of the plurality of symbols associated with a first syntax element, and wherein the fixed model specifies a second adjustment parameter value for a second subset of the plurality of symbols associated with a second syntax element, the first adjustment parameter value being different from the second adjustment parameter value.

7. The one or more processors of claim 1, wherein the adjustment parameter value is appended to a CDF initialization table associated with the set of one or more symbols.

8. The one or more processors of claim 1, wherein the set of one or more symbols comprises a plurality of symbols, and wherein a set of adjustment parameter values associated with the plurality of symbols comprises at least two adjustment parameter values that have a same value; and wherein at least one adjustment parameter value associated with the plurality of symbols is based on a number of coded symbols in the set of one or more symbols.

9. The one or more processors of claim 1, further comprising:

receiving a time interval value associated with the set of one or more symbols; and setting the adaptivity rate parameter value based on the time interval value.

10. The one or more processors of claim 1, further comprising:

accessing, from a look-up table, a set of possible configurations for the adjustment parameter value, wherein the accessing is based on an index value for the look-up table, the index value being appended to a CDF initialization table.

11. The one or more processors of claim 1, wherein the adjustment parameter value is specified for a video frame, a sub-picture, a slice, or a sequence associated with the set of one or more symbols.

12. The one or more processors of claim 1, wherein the adjustment parameter value is specified for a particular block including an intra-coded block, an inter-coded block, a palette coded block, or an intra-block-copy (IBC) coded block associated with the set of one or more symbols.

13. The one or more processors of claim 1, wherein the adjustment parameter value is based on a quantization parameter value associated with the set of one or more symbols.

14. The one or more processors of claim 1, wherein the adjustment parameter value is updated for each intra-coded frame, each B-slice, each P-slice, each key frame, each compound coded frame, or each instantaneous decoder refresh.

15. The one or more processors of claim 1, wherein the adjustment parameter value is updated based on a residual coding scheme of the data comprising the set of one or more symbols.

16. The one or more processors of claim 1, further comprising transmitting the encoded data in a real-time communication or live streaming application, wherein the real-time communication or live streaming application is configured to update the adjustment parameter value.

17. A method comprising:

accessing, by one or more processors, data representing video content, the data comprising a set of symbols each associated with an index value;

performing a probability estimation for encoding the data comprising the set of one or more symbols, the probability estimation comprising:

accessing a window function that maps at least one adaptivity rate parameter value to one or more index values associated with the set of symbols; and updating, based on the at least one adaptivity rate parameter value of the window function, probability values associated with the set of symbols;

generating a probability estimation for the set of symbols based on the updated probability values, the probability estimation comprising a cumulative distribution function (CDF); and encoding, based on the CDF, the data comprising the set of symbols for transmission.

18. The method of claim 17, wherein the at least one adaptivity rate parameter value is applied only to the set of symbols associated with the window function; and wherein the window function defines a normalization parameter for normalizing symbols that are not associated with the window function.

* * * * *